United States Patent
Sugeno et al.

(10) Patent No.: US 10,505,376 B2
(45) Date of Patent: Dec. 10, 2019

(54) POWER STORAGE APPARATUS, ELECTRONIC APPARATUS, ELECTRIC VEHICLE, AND ELECTRIC POWER SYSTEM

(71) Applicant: Murata Manufacturing Co., Ltd., Kyoto (JP)

(72) Inventors: Naoyuki Sugeno, Fukushima (JP); Kohki Watanabe, Fukushima (JP); Noritoshi Imamura, Miyagi (JP); Yusuke Suzuki, Fukushima (JP); Takuma Hashimoto, Fukushima (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 1 day.

(21) Appl. No.: 15/505,169

(22) PCT Filed: Jul. 24, 2015

(86) PCT No.: PCT/JP2015/003719
§ 371 (c)(1),
(2) Date: Feb. 20, 2017

(87) PCT Pub. No.: WO2016/051635
PCT Pub. Date: Apr. 7, 2016

(65) Prior Publication Data
US 2017/0271889 A1 Sep. 21, 2017

(30) Foreign Application Priority Data
Sep. 29, 2014 (JP) .................................. 2014-199044

(51) Int. Cl.
*H02J 7/00* (2006.01)
*H01M 10/42* (2006.01)
(Continued)

(52) U.S. Cl.
CPC ............ *H02J 7/0019* (2013.01); *B60L 58/22* (2019.02); *H01M 2/1077* (2013.01);
(Continued)

(58) Field of Classification Search
CPC ...................................................... H02J 7/0014
(Continued)

(56) References Cited

U.S. PATENT DOCUMENTS 6,538,414 B1    3/2003  Tsuruga et al.
2002/0106564 A1 8/2002  Okawa et al.
(Continued)

FOREIGN PATENT DOCUMENTS

AU    776542 B2     9/2004
CA    2358447 A1    5/2001
(Continued)

OTHER PUBLICATIONS

Extended European Search Report of EP Application No. 15846025.3, dated Mar. 14, 2018, 09 pages of EESR.

*Primary Examiner* — Edward Tso
*Assistant Examiner* — Ahmed H Omar
(74) *Attorney, Agent, or Firm* — Chip Law Group

(57) ABSTRACT

Provided is a power storage apparatus, including: series circuits, the series circuits being formed of first coils and first switching elements, the first coils and the first switching elements being connected to a plurality of battery units in parallel; second coils electromagnetically coupled to the first coils; second switching elements connected to the second coils in series; a capacitor inserted between two common power source lines for commonly supplying voltage to both ends of the series circuits of the second coils and the second switching element related to the plurality of battery units; and a control unit that supplies a control pulse signal to the first switching element and the second switching element for (Continued)

equalizing voltage of each of the plurality of battery units, in which an amount of charge obtained by dividing an amount of transferred charge necessary for eliminating a voltage difference between the first battery unit and the second battery unit into 10 or more is transferred by switching operations of the first and second switching elements.

8 Claims, 36 Drawing Sheets

(51) Int. Cl.
- *H01M 10/44* (2006.01)
- *H01M 2/10* (2006.01)
- *H01M 4/58* (2010.01)
- *H01M 4/587* (2010.01)
- *H01M 10/0525* (2010.01)
- *B60L 58/22* (2019.01)

(52) U.S. Cl.
CPC ......... *H01M 4/587* (2013.01); *H01M 4/5825* (2013.01); *H01M 10/0525* (2013.01); *H01M 10/42* (2013.01); *H01M 10/4264* (2013.01); *H01M 10/44* (2013.01); *H01M 10/441* (2013.01); *H02J 7/008* (2013.01); *H02J 7/0021* (2013.01); *H01M 2010/4271* (2013.01); *H01M 2220/20* (2013.01); *Y02T 10/7055* (2013.01)

(58) Field of Classification Search
USPC ........................................................ 320/116
See application file for complete search history.

(56) References Cited

U.S. PATENT DOCUMENTS

| | | | |
|---|---|---|---|
| 2010/0237830 A1* | 9/2010 | Castelaz | H02J 7/0019 320/118 |
| 2012/0065824 A1 | 3/2012 | Takahashi et al. | |
| 2012/0293129 A1 | 11/2012 | Naghshtabrizi et al. | |
| 2013/0049457 A1* | 2/2013 | Komatsu | H02J 7/0014 307/9.1 |
| 2014/0042974 A1* | 2/2014 | Yang | H01M 10/441 320/119 |
| 2017/0264111 A1 | 9/2017 | Komatsu et al. | |

FOREIGN PATENT DOCUMENTS

| | | | | |
|---|---|---|---|---|
| CA | 2358256 A1 | 4/2002 | | |
| CA | 2757943 A1 | 12/2010 | | |
| CN | 1349266 A | 5/2002 | | |
| CN | 1409884 A | 4/2003 | | |
| CN | 101939893 A | 1/2011 | | |
| CN | 102803977 A | 11/2012 | | |
| CN | 102969522 A | 3/2013 | | |
| CN | 202856390 U | 4/2013 | | |
| CN | 202856391 U | 4/2013 | | |
| CN | 104011961 A | 8/2014 | | |
| DE | 60027037 T2 | 8/2006 | | |
| EP | 1195836 A2 | 4/2002 | | |
| EP | 1198050 A1 | 4/2002 | | |
| EP | 1659671 A2 | 5/2006 | | |
| EP | 2438452 A1 | 4/2012 | | |
| EP | 2587614 A2 | 5/2013 | | |
| JP | 2002-117833 A | 4/2002 | | |
| JP | 2002-223528 A | 8/2002 | | |
| JP | 3997702 B2 | 10/2007 | | |
| JP | 2008-035680 A | 2/2008 | | |
| JP | 2008-271708 A | 11/2008 | | |
| JP | 2010-283922 A | 12/2010 | | |
| JP | 4772137 B2 | 9/2011 | | |
| JP | 2012-023948 A | 2/2012 | | |
| JP | 2013-051856 | * | 3/2013 | ............... H02J 7/02 |
| JP | 2013-051856 A | 3/2013 | | |
| JP | 2013-051857 A | 3/2013 | | |
| JP | 2014-138546 A | 7/2014 | | |
| JP | 5668890 B1 | 2/2015 | | |
| JP | 2015-043689 A | 3/2015 | | |
| KR | 10-2002-0027286 A | 4/2002 | | |
| KR | 10-2013-0024787 A | 3/2013 | | |
| MX | 236631 B | 5/2006 | | |
| NO | 20013309 A | 8/2001 | | |
| TW | 492021 B | 6/2002 | | |
| TW | 525312 B | 3/2003 | | |
| WO | 01/33692 A1 | 5/2001 | | |
| WO | 2010/140044 A1 | 12/2010 | | |

* cited by examiner ically using a lithium ion secondary battery using an olivine type cathode, the slope of the charge and discharge curve is small, there is substantially no voltage difference between cells or assembled batteries in the normal charge and discharge area, and the voltage difference and capacity
POWER STORAGE APPARATUS, ELECTRONIC APPARATUS, ELECTRIC VEHICLE, AND ELECTRIC POWER SYSTEM

CROSS REFERENCE TO RELATED APPLICATIONS

This application is a U.S. National Phase of International Patent Application No PCT/JP2015/003719 filed on Jul. 24, 2015, which claims priority benefit of Japanese Patent Application No. JP 2014-199044 filed in the Japan Patent Office on Sep. 29, 2014. Each of the above-referenced applications is hereby incorporated herein by reference in its entirety.

TECHNICAL FIELD

The present disclosure relates to a power storage apparatus, and an electronic apparatus, an electric vehicle, and an electric power system that use electric power from the power storage apparatus.

BACKGROUND ART

In recent years, the application of a secondary battery such as a lithium ion battery is rapidly expanded to a power storage apparatus for storing electric power, which is combined with a new energy system such as a solar battery and wind power generation, a storage battery for automobile, and the like. In the case where many power storage elements such as unit batteries (also referred to as unit cell or cell, in the following description, appropriately referred to as battery cell) are used to generate significant power, a configuration in which a plurality of power storage modules are connected to each other in series is employed. In the power storage module, a plurality of battery cells, e.g., four battery cells are connected to each other in parallel and/or in series, thereby constituting a battery block. Many battery blocks are housed in an exterior enclosure, and thus, the power storage module (referred to also as assembled battery) is configured.

Further, a battery system in which a plurality of power storage modules are connected to each other and a common control apparatus is provided for the plurality of power storage modules has been known. In the battery system, a configuration in which each power storage module includes a module controller and the module controller and the control apparatus communicate with each other via a communication means is employed.

In the case where a plurality of battery cells are used, even when one of the plurality of battery cells reaches the use lower limit voltage at the time of discharge due to the difference of self-discharge between the battery cells and the like, another battery cell does not reach the use lower limit voltage yet in some cases. In the case where the battery cells are charged again in such a state, such a problem that some battery cells are not sufficiently charged, and the performance of the battery cells is not sufficiently delivered occurs.

In order to correct such variability of the plurality of battery cells, an attempt has been made to control the balance between the battery cells. Further, in Patent Literature 1, it is described that many battery cells are divided into a plurality of series cell groups, an inter-cell voltage balance correction circuit is provided in each cell group, and an inter-group voltage balance correction circuit is provided. The inter-group voltage balance correction circuit is configured to cause AC (alternating-current) coupling formed by using a transformer coil and a switching circuit to perform balance correction on the series voltage of each cell group.

The inter-group voltage balance correction circuit described in Patent Literature 1 can be applied for correcting the balance of the battery group of the power storage module. However, although a coil is connected for each cell group, the coil is configured to be wound around a common magnetic core. Therefore, in the case where it is connected to the plurality of power storage modules housed in separate enclosures, it needs to house the coil and the magnetic core in separated enclosures. Because star-like wiring in which the plurality of power storage modules are connected to this different transformer apparatus is performed, there is a problem of complicated connection in the case where the number of power storage modules is increased.

Further, because uniform voltage is obtained by controlling the switching circuit to perform a turning on/off operation in the same phase, it is difficult to control the switching operation separately for each cell group. Therefore, there has been such a problem that it is difficult to transmit electric power from a particular cell group having high voltage to a particular cell group having low voltage. Further, in the case where a common coil and switching element are provided on the secondary side of the transformer, total voltage of series circuits of a plurality of cell groups is applied to this switching element, and there has been such a problem that it is difficult to ensure the pressure resistance of the switching element.

The applicant has proposed a power storage apparatus in which it does not need to configure a transformer as an apparatus different from a power storage module and the pressure resistance of a switching element can be easily ensured as described in Patent Literature 2. In the power storage apparatus described in Patent Literature 2, the modules are well-balanced by providing a transformer and a switching element for each module and controlling turning on/off of the switching element to cause charges to move from the module having high voltage to the module having low voltage. Specifically, the difference between the amount of charge on the side of high voltage and the amount of charge on the side of low voltage side is eliminated separately in several times.

CITATION LIST

Patent Literature

Patent Literature 1: Japanese Patent Application Laid-open No. 2008-035680
Patent Literature 2: Japanese Patent Application Laid-open No. 2013-051856

DISCLOSURE OF INVENTION

Technical Problem

As a lithium ion secondary battery, those using an olivine type cathode material such as olivine type iron lithium phosphate have been known. The olivine type iron lithium phosphate has a strong crystalline structure and advantages of high thermal stability in high temperature. In the case of a module that uses a lithium ion secondary battery using an olivine type cathode, the slope of the charge and discharge curve is small, there is substantially no voltage difference between cells or assembled batteries in the normal charge and discharge area, and the voltage difference and capacity difference due to the variability of the capacity are extremely small. In the case of such a module that uses a lithium ion secondary battery using an olivine type cathode, such a problem that it is difficult to perform equalization by several times of charge movement in a relatively long cycle as described in Patent Literature 2 is recognized.

Therefore, it is an object of the present disclosure to provide a power storage apparatus, an electronic apparatus, an electric vehicle, and an electric power system that are capable of performing equalization between modules that use a lithium ion secondary battery using an olivine type cathode.

Solution to Problem

In order to improve such circumstances, the present disclosure is a power storage apparatus, including: a plurality of battery units, each of the plurality of battery units being formed of a plurality of battery cells or a plurality of battery blocks; series circuits, the series circuits being formed of first coils and first switching elements, the first coils and the first switching elements being connected to the respective battery units in parallel; second coils electromagnetically coupled to the first coils; second switching elements connected to the second coils in series; a capacitor inserted between a common power source line CL+ and a common power source line CL− for commonly supplying voltage to both ends of the series circuits of the second coils and the second switching element related to the plurality of battery units, the voltage being set to a value not more than pressure resistance of the second switching elements; and a control unit that supplies a control pulse signal to the first switching element and the second switching element for equalizing voltage of each of the plurality of battery units, in which the plurality of battery units include a first battery unit, the first battery unit having the highest voltage, electric power being taken out from the first battery unit by the first and second switching elements connected to the first battery unit, the plurality of battery units include a second battery unit, the second battery unit having the lowest voltage, electric power being supplied to the second battery unit by the first and second switching elements connected to the second battery unit, and an amount of charge obtained by dividing an amount of transferred charge necessary for eliminating a voltage difference between the first battery unit and the second battery unit into 10 or more is transferred by switching operations of the first and second switching elements.

The present disclosure is a power storage apparatus that includes the above-mentioned power storage apparatus and supplies electric power to an electronic apparatus connected to the power storage apparatus.

The present disclosure is an electronic apparatus, that receives electric power supplied from the above-mentioned power storage apparatus.

The present disclosure is an electric vehicle, including: a conversion apparatus that receives electric power supplied from the above-mentioned power storage apparatus and converts the electric power into a driving force of a vehicle; and a control apparatus that executes information processing related to vehicle control on the basis of information on the power storage apparatus.

The present disclosure is an electric power system, including: an electric power information transmission/reception unit that transmits/receives a signal to/from another apparatus via a network, in which charge and discharge control of the above-mentioned power storage apparatus is performed on the basis of information received by the electric power information transmission/reception unit.

The present disclosure is an electric power system, that receives electric power from the above-mentioned power storage apparatus or supplies electric power to the power storage apparatus from a power generation apparatus or an electric power network.

Advantageous Effects of Invention

According to at least one of the embodiments, an inter-module balance circuit in the present disclosure is capable of achieving balance even in the case where the voltage difference is small because the amount of charge obtained by dividing the amount of transferred charge necessary for eliminating the voltage difference between modules into 10 or more is transferred. Note that the content of the present disclosure is not interpreted to be limited by the exemplified effects in the following description.

MODE(S) FOR CARRYING OUT THE INVENTION

Embodiments to be described below are desirable specific examples of the present invention, and technically desirable various limitations are given. In the following description, however, the scope of the present invention is not limited to the embodiments unless description of limiting the present invention is made.

(Power Storage System)

In the case where many power storage elements such as battery cells are used to generate significant power, a configuration in which a plurality of power storage units (hereinafter, referred to as power storage modules) are connected and a common control apparatus is provided for a plurality of power storage modules is employed. Such a configuration is referred to as the power storage system.

Figure 1:
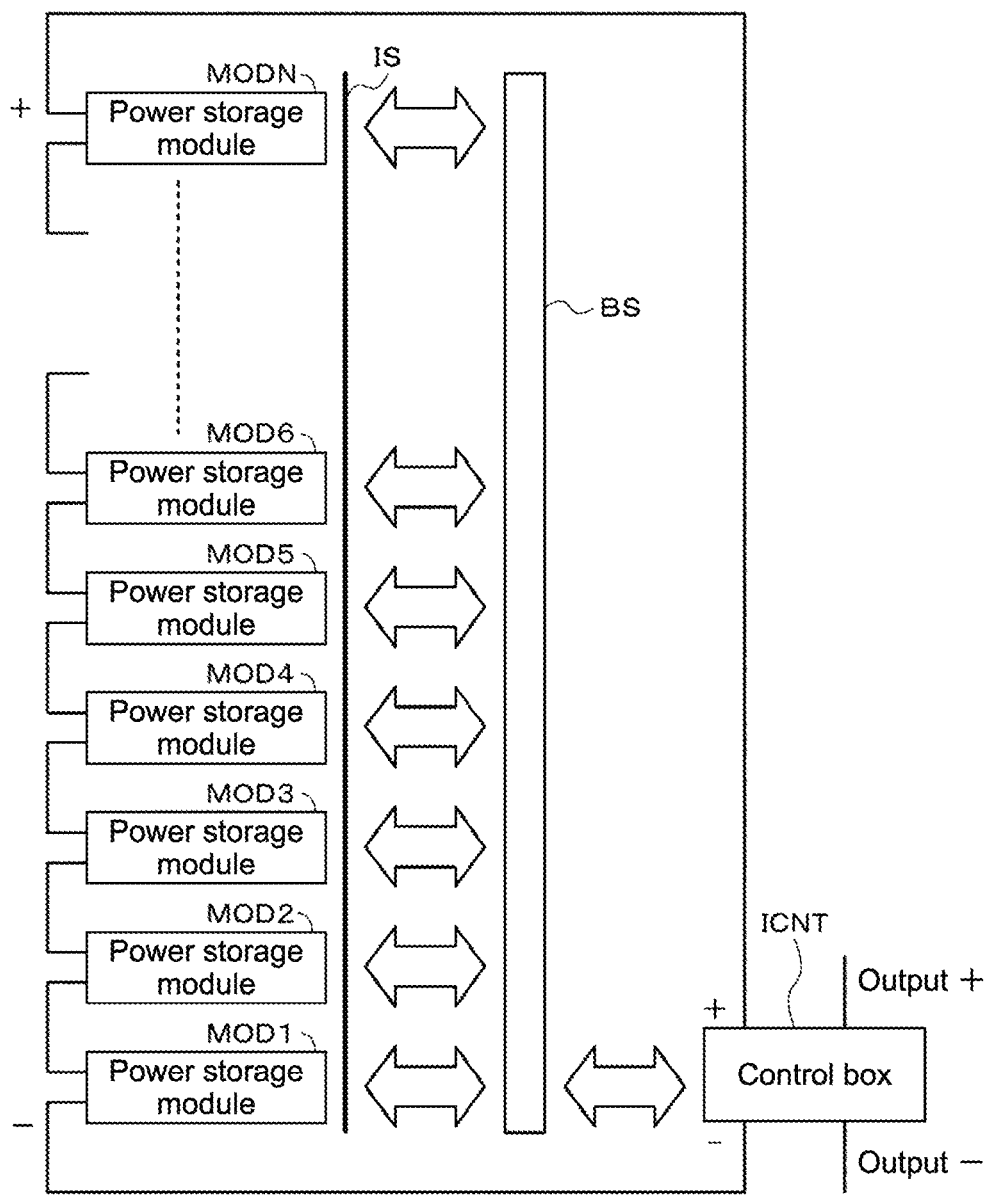
FIG. 1 A block diagram of an example of a power storage system.

The power storage module is a unit obtained by combining a plurality of battery cells and a controller. As shown in FIG. 1, N power storage modules MOD1 to MODN are connected in series. The power storage modules MOD1 to MODN are connected to an interface bus BS via an insulating portion IS.

Further, each module controller is connected to an entire control apparatus (hereinafter, appropriately referred to as the control box) ICNT, and the control box ICNT performs charge management, discharge management, and management for degradation reduction and the like. The control box ICNT includes a microcomputer.

As a bus in the power storage module and the bus BS that connects the power storage modules MOD1 to MODN and the control box ICNT, a serial interface is used. As the serial interface, specifically, an SM bus (System Management Bus), a CAN (Controller Area Network), an SPI (Serial Peripheral Interface), and the like are used. For example, an I2C bus can be used. The I2C bus performs serial communication in a synchronous method with two signal lines of an SCL (serial clock line) and a bidirectional SDA (serial data line).

The module controller CNT of each power storage module MOD and the control box ICNT communicate with each other. Specifically, the control box ICNT receives information on the internal state of each power storage module, i.e., battery information, and the charge processing and discharge processing of each power storage module are managed. The control box ICNT supplies the output (N×51.2 V) of series connection of the N power storage modules to the load. In the case of an example in which N=14, the output is (14×51.2 V=716.8 V).

(Example of Power Storage Module)

Figure 2:
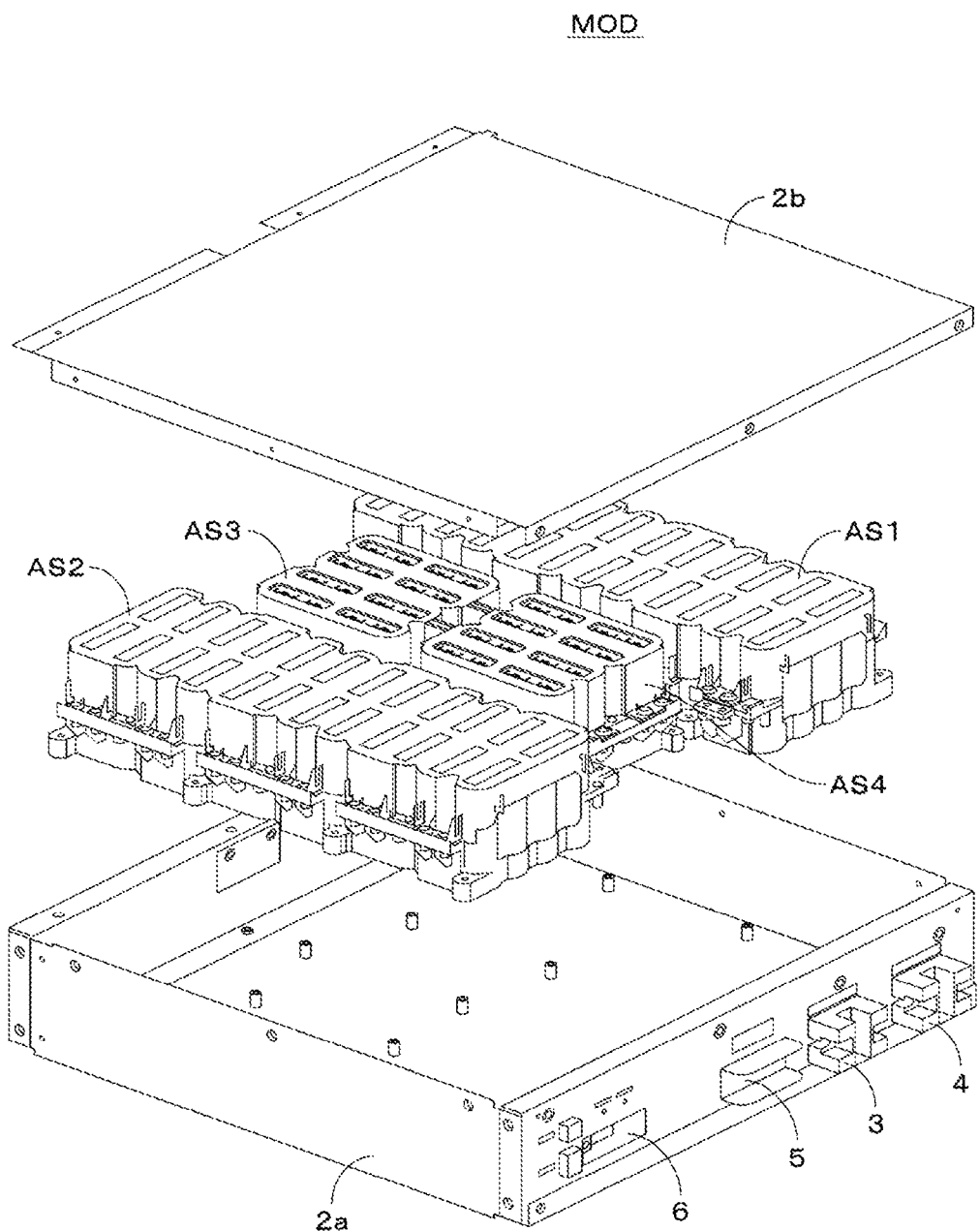
FIG. 2 An exploded perspective view of an example of a power storage module.

FIG. 2 is a perspective view showing the mechanical configuration of the power storage module MOD. The exterior enclosure of the power storage module MOD includes an exterior lower enclosure 2a and an exterior upper enclosure 2b, which are made of metal. Sheet metal processing has been performed on the exterior lower enclosure 2a and the exterior upper enclosure 2b. As the material of the exterior lower enclosure 2a and the exterior upper enclosure 2b, it is favorable to use a material having a high thermal conductivity and radiation rate. It is possible to achieve an excellent casing heat dissipation property and reduce temperature rise in the enclosure. For example, examples of the material of the exterior lower enclosure 2a and the exterior upper enclosure 2b include aluminum, an aluminum alloy, copper, and a copper alloy. On the back surface of the enclosure, an external cathode terminal 3 and an external anode terminal 4 for charge and discharge of the power storage module MOD are provided.

Further, on the back surface of the power storage module MOD, a current breaker 5 is provided. By providing the current breaker 5, it is possible to improve the safety. Further, a connector unit 6 for communication with a control circuit placed in the enclosure 2 is provided. The control circuit is provided to monitor the temperature in the battery unit and control charging, discharging, and the like. Further, on the front surface of the enclosure, a display element such as an LED, which shows the operation state, is provided.

The exterior lower enclosure 2a of the enclosure has a box-shaped configuration, and the exterior upper enclosure 2b is provided so as to cover the opening of the exterior lower enclosure 2a. In the housing space of the exterior lower enclosure 2a, submodules AS1 to AS4 are housed. In order to fix the submodules AS1 to AS4 by screws or the like, a plurality of bosses are formed on the bottom surface of the exterior lower enclosure 2a. The submodules AS1 to AS4 are assembled outside the enclosure in advance.

Each submodule is obtained by integrally forming a plurality of battery blocks with insulating enclosures as sub-enclosures. As the enclosure of the submodule, a molded part such as plastic can be used. The submodules AS1 to AS4 each house a plurality of battery blocks in the enclosure so that the cathode terminal and the anode terminal of the internal battery block are not exposed.

One battery block is obtained by, for example, connecting eight cylindrical lithium ion secondary batteries in parallel. The submodules AS1 and AS2 are each obtained by integrally forming six battery blocks with an upper enclosure and a lower enclosure. The submodules AS3 and AS4 are each obtained by integrally forming two battery blocks with an upper enclosure and a lower enclosure. Therefore, in total, (6+6+2+2=16) battery blocks are used. These battery blocks are connected in series, for example.

In each of the submodules AS1 to AS4, a metal plate for connection such as a bus bar is used to connect the battery blocks in series. The bus bar is metal in a long bar shape. In the bus bar, a plurality of holes are formed for connection with a connection metal plate or the like derived from the battery block.

Figure 3:
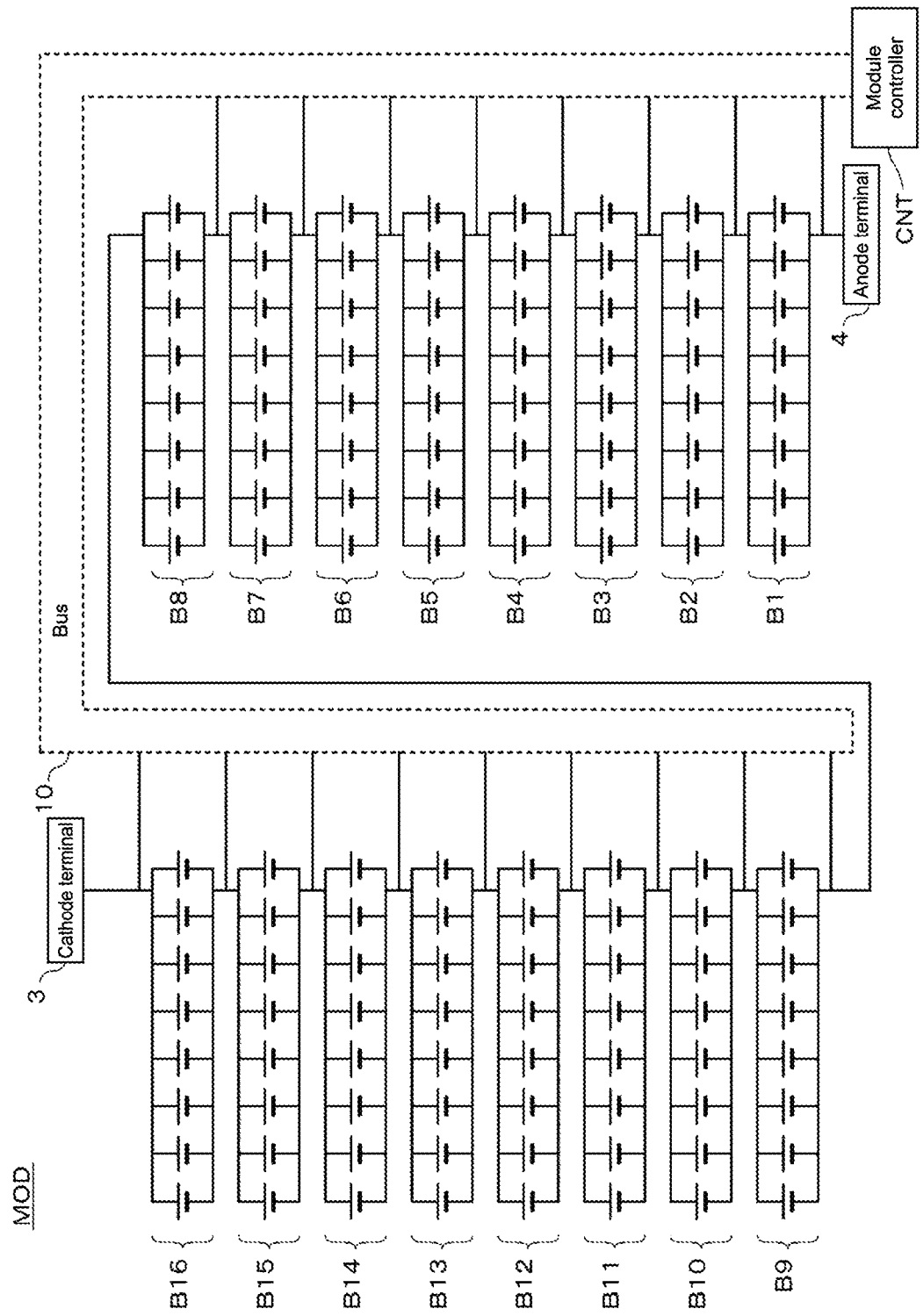
FIG. 3 A connection diagram showing the connection configuration of an example of the power storage module.

As shown in FIG. 3, battery blocks B1 to B16 are connected in series. In each battery block, eight batteries are connected in parallel. Connecting eight batteries in parallel is referred to as 8P. Connecting 16 battery blocks in series is referred to as 16S. Therefore, a battery unit (appropriately referred to as the battery block group) BB of the module shown in FIG. 3 has a configuration of 8P16S. Each of the battery blocks B1 to B16 is connected to the module controller CNT as the control apparatus of each power storage module. Charge and discharge of the battery blocks B1 to B16 is controlled by the module controller CNT. The charge and discharge is performed via the external cathode terminal 3 and the external anode terminal 4. For example, the submodule AS1 includes the battery blocks B1 to B6, and the submodule AS2 includes the battery blocks B11 to B16. Further, the submodule AS3 includes the battery blocks B7 and B10, and the submodule AS4 includes the battery blocks B8 and B9.

Information on voltage between the positive electrode and the negative electrode of each battery block or the like is supplied to the module controller CNT via a bus 10. The module controller CNT monitors voltage, current, and temperature of each battery block, and outputs the monitoring result as battery information. For example, one power storage module MOD outputs (16×3.2V=51.2 V).

Figure 4:
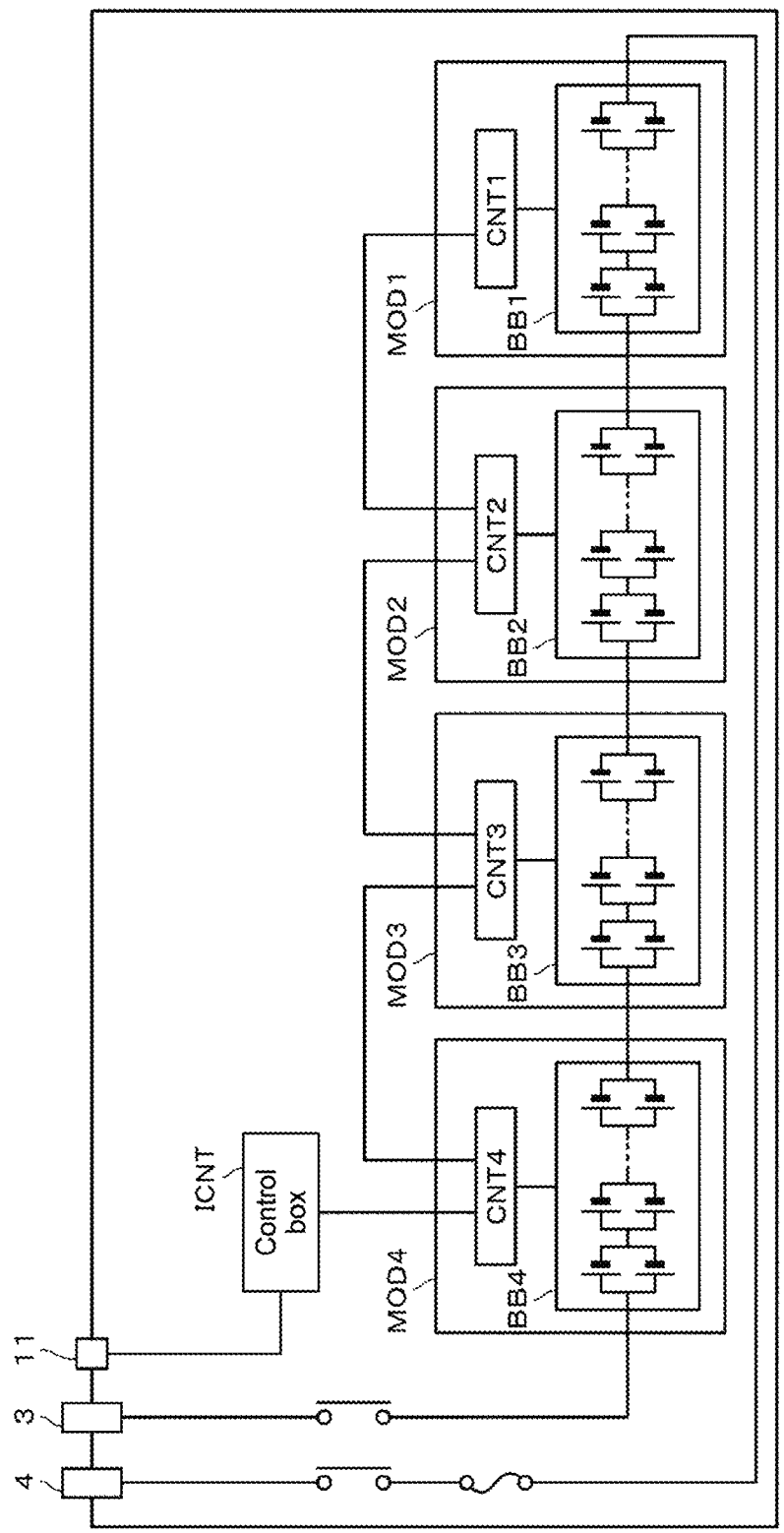
FIG. 4 A block diagram showing the specific configuration of the power storage system.

In FIG. 4, a more specific connection configuration of the power storage system is shown. For example, four power storage modules MOD1 to MOD4 are connected in series. In this case, the total voltage taken out from the cathode terminal 3 (VB+) and the anode terminal 4 (VB−) is approximately 200 V. The power storage modules MOD1 to MOD4 respectively include the module controllers CNT1 to CNT4 and the battery block groups BB1 to BB4. Each battery block group is series connection of 16 battery blocks, for example.

The module controllers CNT1 to CNT4 are connected via a bus and a communication terminal of the module controller CNT4 is connected to the control box ICNT. Information on voltage for each module, for example, is transmitted from each module controller to the control box ICNT. The control box ICNT further includes a communication terminal 11 so as to be capable of communicating with the outside.

(Regarding Example of Secondary Battery)

An example of the secondary battery used in the embodiments of the present disclosure is a lithium ion secondary battery containing a cathode active material and a carbon material such as graphite as an anode active material, and contains a cathode active material having an olivine structure as a cathode material.

As the cathode active material having an olivine structure, more favorably, a lithium iron phosphate compound ($LiFePO_4$) or a lithium iron complex phosphate compound ($LiFe_xM_{1-x}O_4$: M represents one or more kinds of metals, x satisfies the formula of 0<x<1) containing an exotic atom is used. In the case where M is two kinds or more, selection is performed so that the sum of subscripts is 1-x.

Examples of the M include transition elements, group IIA elements, group IIIA elements, group IIIB elements, and group IVB elements. In particular, it is favorable to contain at least one of cobalt (Co), nickel, manganese (Mn), iron, aluminum, vanadium (V), and titanium (Ti).

The cathode active material may be a lithium iron phosphate compound or lithium iron complex phosphate compound having a covering layer on the surface thereof. The covering layer contains a metal oxide (e.g., selected from the group consisting of Ni, Mn, Li, and the like) or phosphate compound (e.g., lithium phosphate), which has a composition different from that of the oxide, or the like.

As the cathode material that is capable of absorbing and emitting lithium (Li), a lithium complex oxide such as a lithium cobalt oxide ($LiCoO_2$), lithium nickel oxide ($LiNiO_2$), or lithium manganite ($LiMnO_2$), which has a layered rock-salt structure, and lithium manganate ($LiMn_2O_4$) having a spinel structure may be used.

The graphite used as the anode active material is not particularly limited, and a graphite material used in the industry can be widely used. As the material of the anode, lithium titanate, a silicon (Si)-based material, a tin (Sn)-based material, and the like may be used.

The method of producing the electrode of the battery is not particularly limited, and a method used in the industry can be widely used.

The electrolyte solution used in the present disclosure is not particularly limited. It may include a liquid solution and a gel solution, and the electrolyte solution used in the industry can be widely used.

The discharge property of the module using a secondary battery that contains a cathode active material having an olivine structure as a cathode material is different from the discharge property of the module using a secondary battery that uses NCM (nickel cobalt manganese) as a cathode material. In the case of the module using a secondary battery that contains a cathode active material having an olivine structure as a cathode material, the reduction of voltage is small even when discharge progresses. The range of SOC is 20% to 80%, and the voltage difference is within 0.2V/cell. On the other hand, in the case of the module using a secondary battery that uses NCM, the proportion of the reduction of voltage along with the progression of discharge is large.

(Example of Module Controller)

An example of the configuration of the module controller will be described with reference to FIG. 5. The module controller CNT detects voltage at both ends of n battery blocks B1 to Bn connected in series and voltage of each battery block. A multiplexer 15 that sequentially outputs voltage at both ends of the battery blocks B1 to Bn and voltage of each battery block is provided.

The multiplexer 15 switches channels in response to a predetermined control signal and selects one piece of analog voltage data from n pieces of analog voltage data, for example. The one piece of analog voltage data selected by the multiplexer 15 is supplied to an A/D converter (written as ADC (Analog to Digital Converter) in the figure) 16.

The A/D converter 16 converts the analog voltage data supplied from the multiplexer 15 into digital voltage data. For example, the analog voltage data is converted into digital voltage data of 14 to 18 bits. Note that the A/D converter 16 is capable of using various methods such as a successively comparing method and a $\Delta\Sigma$ (delta sigma) method.

The digital voltage data from the A/D converter 16 is supplied to a communication unit 17. The communication unit 17 is controlled by a control unit 18, and performs communication with an external apparatus connected via communication terminals 19a and 19b. For example, it communicates with the module controller of another module via the communication terminal 19a, and communicates with the controller box ICNT via the communication terminal 19b. Further, via the communication terminal 19b, the module controller CNT receives the control signal from the control box ICNT. In such a way, the communication unit 17 performs bidirectional communication.

Further, the control unit 18 controls voltage uniformity of a battery block. Such control is referred to as the cell balance control. For example, in the case where one battery block in the plurality of battery blocks B1 to Bn reaches the use lower limit discharge voltage, there is a different battery block that still has a capacity. In the case where they are charged next, the different battery block that still has had a capacity reaches the charge upper limit voltage fast, and so, it is difficult to achieve full charge. In order to avoid such unbalance, the battery block that still has a capacity is forced to be discharged by turning on the MOSFET (Metal Oxide Semiconductor Field Effect Transistor). Note that the method of the cell balance control is not limited to the above-mentioned passive method, and a so-called active method or other various methods can be applied. The inter-module balance control in the present disclosure will be described later in detail.

Note that the above-mentioned module controller CNT monitors the voltage of each battery block, converts the detected voltage into a digital signal, and transmits it to the control box ICNT. It may detect the temperature of each battery block in addition to the voltage, convert the temperature into digital data, and transmit it to the control box ICNT.

Figure 5:
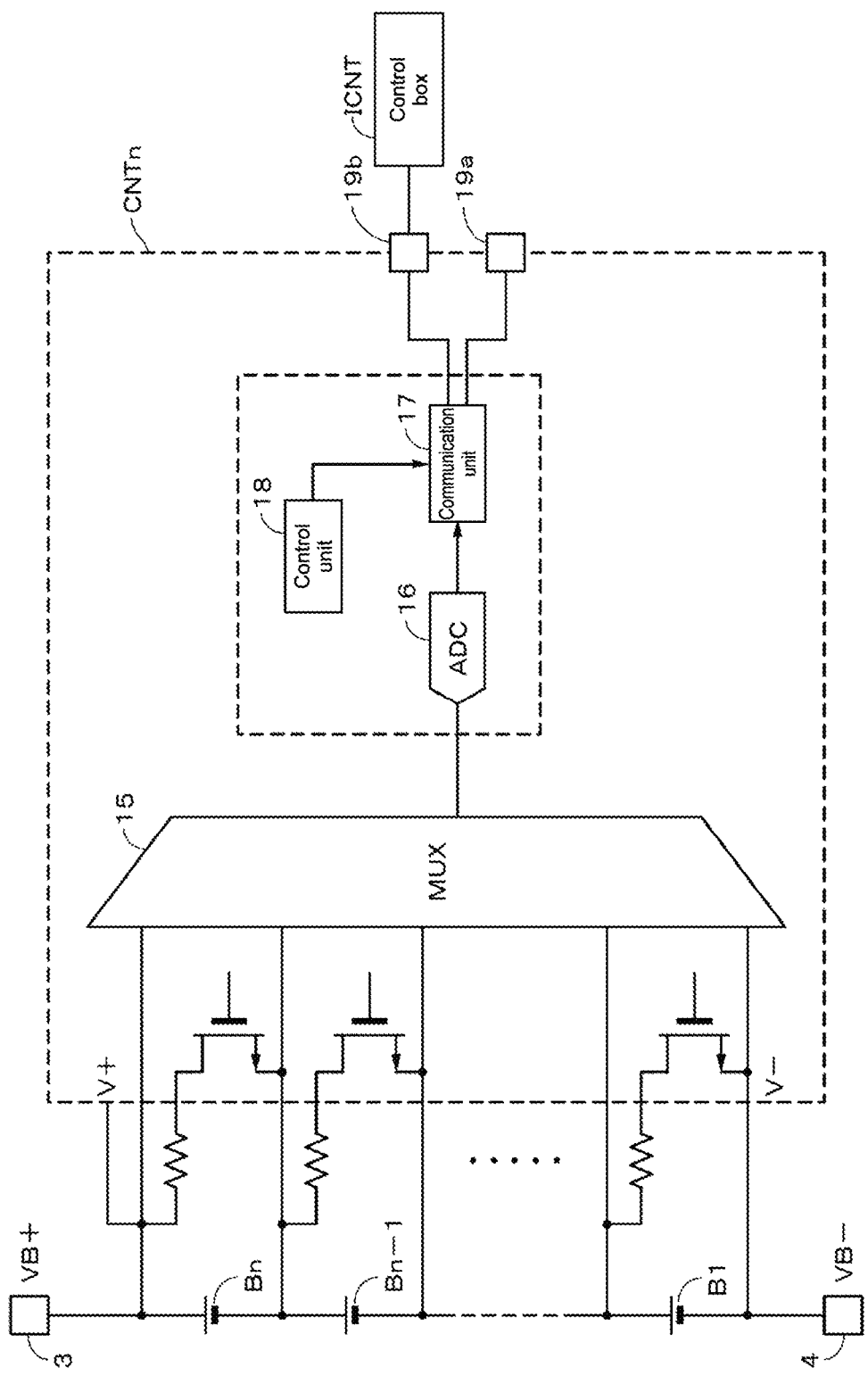
FIG. 5 A block diagram of an example of a module controller.

As shown in FIG. 5, the power source for the module controller CNT is supplied from the battery blocks B1 to Bn. However, when the battery blocks B1 to Bn are used as the power source, variability of capacities of the battery blocks B1 to Bn between modules is generated and inter-module unbalance occurs because the power consumption of each module controller CNT is not equal. In this regard, it is favorable not to use the battery blocks B1 to Bn as the power source of the module controller CNT.

In the module controller CNT shown in FIG. 5, the A/D converter 16, the communication unit 17, and the control unit 18 are a low voltage power source unit that is capable of operating with a power source of low voltage such as 5V as shown by surrounding them with inner broken lines. In the present disclosure, the power source for the low voltage power source unit is supplied from the control box ICNT. When the power source is supplied from the battery blocks B1 to Bn, there is fear that the inter-module balance is collapsed due to the difference between the power consumption of the module controller CNT. In the present disclosure, since the power source for the low voltage power source unit of the module controller CNT is supplied from the control box ICNT, such a problem does not occur.

(Power Storage System According to Present Disclosure)

Figure 6:
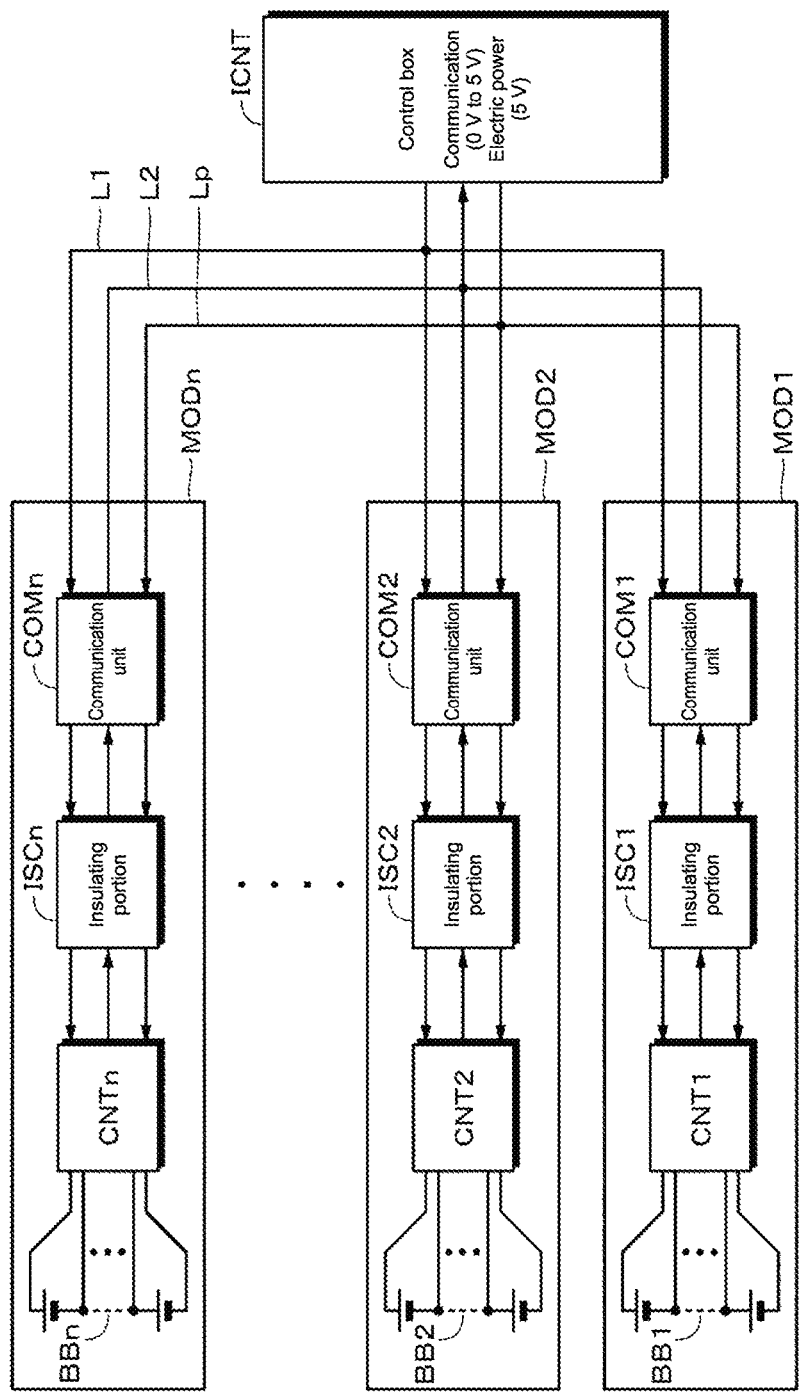
FIG. 6 A block diagram showing the configuration of the power storage system to which a plurality of power storage modules are connected.

The configuration of the power storage system including the n power storage modules MOD1 to MODn, to which the present disclosure is applied, is shown in FIG. 6. The power storage modules MOD1 to MODn respectively include communication units COM1 to COMn, insulating portions ISC1 to ISCn, module controllers CNT1 to CNTn, and battery block groups BB1 to BBn. The n power storage modules and the control box ICNT are connected to each other. For connection, communication lines L1 and L2 and a power source line Lp are used. Via the communication lines L1 and L2, bidirectional communication is performed between the control box ICNT and the power storage modules MOD1 to MODn. As the communication method, the CAN is used, for example. Recently, the CAN is used as an on-vehicle LAN.

The communication units COM1 to COMn of the power storage modules correspond to the communication unit 17 in FIG. 5. Therefore, the module controllers CNT1 to CNTn in FIG. 6 have a configuration including no communication unit 17 as compared with the configuration in FIG. 5. Note that both of the communication units COM1 to COMn and the communication unit 17 may be provided to have different functions. Via the power source line Lp, for example, the power source voltage of +5 V is supplied as the power source of the low voltage power source unit of each power storage module.

The insulating portions ISC1 to ISCn respectively have a function of insulating the communication units COM1 to COMn from the module controllers CNT1 to CNTn. Specifically, the reference potential of each power source of the communication units COM1 to COMn and the reference potential of each power source of the module controllers CNT1 to CNTn are separated and independent from each other. Further, the insulating portions ISC1 to ISCn respectively have a function of supplying the power source voltage to the module controllers CNT1 to CNTn and each function as a transmission medium of bidirectional communication, in the insulated state.

As an example, the power source voltage of the control box ICNT and the communication units COM1 to COMn is 0 to +5 V. The power source voltage of the module controller CNT1 of the power storage module MOD1 is 0 to +5 V, the power source voltage of the module controller CNT2 of the power storage module MOD2 is +50 V to +55 V, and the power source voltage of the module controller CNTn of the power storage module MODn is (+50×n) V to (+50×n)+5 V.

(Insulating Portion)

As the method of bidirectional communication performed via the insulating portions ISC1 to ISCn, the CAN standard can be used. As the method of transmitting electric power via the insulating portions ISC1 to ISCn, it is possible to use an electromagnetic induction method, a magnetic field resonance method, a radio wave reception method, and the like.

In the present disclosure, a non-contact IC card technology is used. In the non-contact IC card technology, an antenna coil of a reader/writer and an antenna coil of a card are magnetic flux-coupled with each other, and communication and electric power transmission are performed between the reader/writer and the card. The communication uses the method of ASK (Amplitude Shift Keying)-modulating the carrier wave of a frequency of 13.56 kHz, and is performed at a speed of 212 or 424 kbps. The specification of the insulating portions ISC1 to ISCn is the same as that of the above-mentioned non-contact IC card method. Further, the insulating portions ISC1 to ISCn are provided so that communication and electric power transmission are performed between antennas (coils) formed in different layers of a multilayer printed circuit board.

Figure 7:
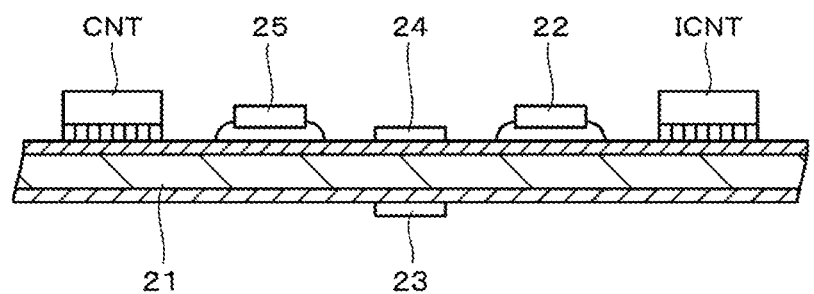
FIG. 7 A schematic diagram showing the mounting state of parts on a multilayer wiring substrate of each power storage module.

As shown in FIG. 7, on a multilayer printed circuit board 21, an MPU (Micro Processing Unit) constituting the control box ICNT and an LSI (Large Scale Integrated Circuit) 22 on the side of the reader/writer using the non-contact IC card method are mounted. Further, printed circuit board antennas 23 and 24, an LSI 25 on the side of the card using the non-contact IC card method, and the module controller CNT are mounted on the multilayer printed circuit board 21.

Figure 8:
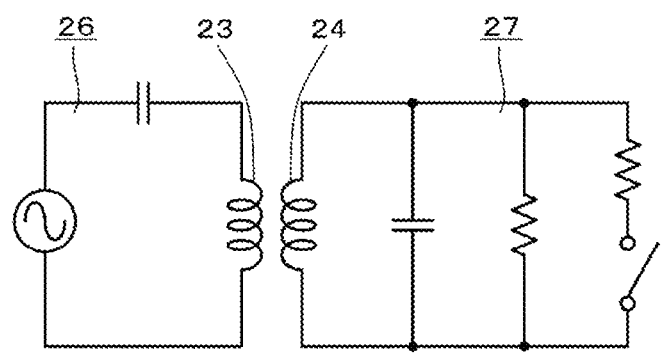
FIG. 8 A connection diagram showing the circuit configuration of an insulating portion.

As conceptually shown in FIG. 8, in the non-contact IC card method, for example, a transmission signal for a card unit 27, which has a carrier wave amplitude of 2 to 13 Vop and the degree of modulation of approximately 10%, is formed from the antenna 23 of a reader/writer unit 26. The transmission signal is transmitted from the antenna 23 to the antenna 24 of the card unit 27. In the antenna 24, the received signal is a high-frequency signal having a carrier wave amplitude of 2 to 13 Vop and the degree of modulation of approximately 10%, for example. By smoothing the received signal, the power source in the card unit 27 is formed. The power consumption in the card unit 27 is sufficiently small.

Figure 9A:
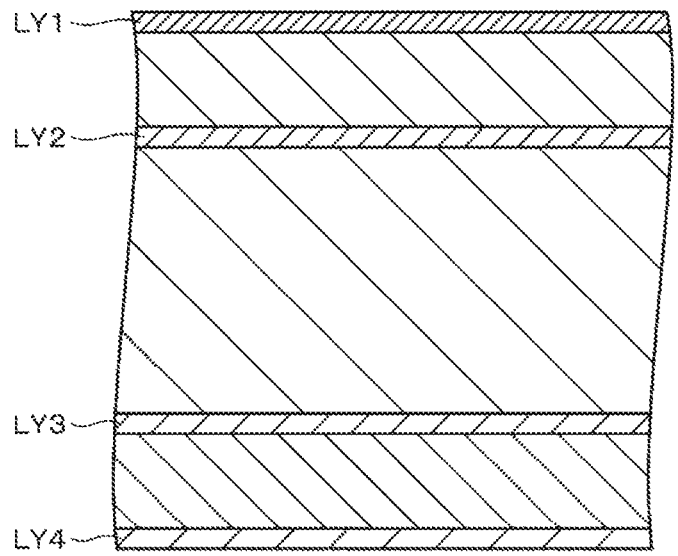
FIGS. 9(A) and 9(B) A cross-sectional view for describing a two-layered wiring substrate and a four-layered wiring substrate.
Figure 9B:
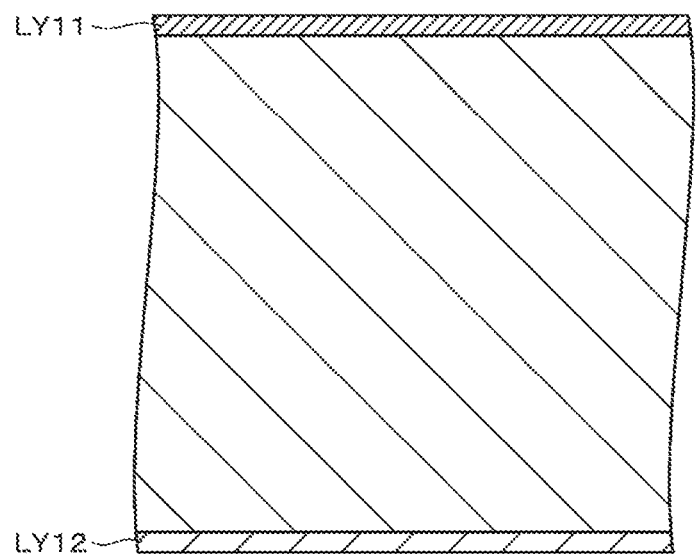

An example of the printed circuit board antenna will be described. As the multilayer printed circuit board 21 on which the antenna is formed as a conductive pattern, four-layered printed circuit board including four wiring layers LY1 to LY4 is used as shown in FIG. 9(A). Alternatively, as shown in FIG. 9(B), two-layered printed circuit board including two wiring layers LY11 and LY12 is used.

Figure 10A:
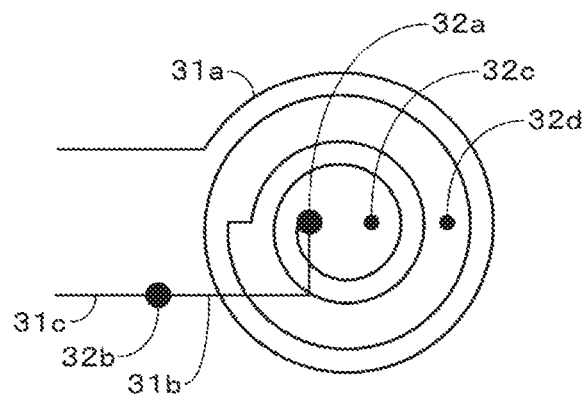
FIGS. 10(A) and 10(B) A schematic diagram for describing a specific example of a printed circuit board antenna.

As shown in FIG. 10(A), the primary side antenna 23 (the side of the reader/writer) is formed of a spiral pattern 31a, a linear pattern 31b, and a linear pattern 31c. The spiral pattern 31a is formed on the fourth wiring layer LY4 of the four-layered printed circuit board, and the end portion of the central portion of the pattern 31a is connected to a land 32a of the third wiring layer LY3 via a land and a through hole. The linear pattern 31b is formed between the land 32a and the land 32b. The land 32b is connected to the linear pattern 31c via a through hole and a land of the third wiring layer LY3. End portions of the patterns 31a and 31c are connected to a connector (not shown).

Figure 10B:
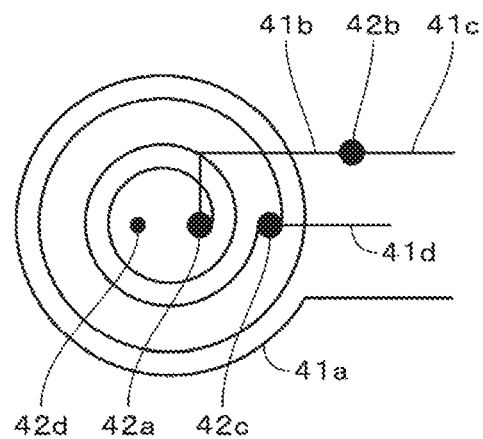

As shown in FIG. 10(B), the secondary side antenna 24 (the side of the card) is formed of a spiral pattern 41a, a linear pattern 41b, a linear pattern 41c, and a linear pattern 41d. The spiral pattern whose one end is connected to a connector (not shown) is formed in the first wiring layer LY1 of the four-layered printed circuit board. It is connected to the linear pattern 41b via a land 42a, a through hole, and a land of the second wiring layer LY2. One end of the pattern 41b is connected to a land of the first wiring layer LY1 via a land 42b and a through hole. One end of the linear pattern 41c is connected to this land of the first wiring layer LY1. Other end of the linear pattern 41c is connected to a connector (not shown). Further, one end of the linear pattern 41d is connected to a land 42c connected to the spiral pattern 41a. The other end of the linear pattern 41d is connected to a reference potential point.

In the case where the patterns intersect with each other, patterns of different wiring layers form a printed circuit board antenna. In order to connect the different wiring layers to each other, a through hole and land are used. As a result, unnecessary lands 32c and 32d are formed in the fourth wiring layer as shown in FIG. 10(A), and an unnecessary land 42d is formed in the first wiring layer.

It may be possible to use a jumper line instead of forming the above-mentioned pattern in another wiring layer of the printed circuit board. Specifically, a jumper line is used instead of the pattern 31b in FIG. 10(A) and the patterns 41b and 41d in FIG. 10(B). In this case, it is possible to use a two-layered printed circuit board, it is unnecessary to form a through hole, and it is possible to prevent an unnecessary land to be formed. By not forming a through hole, it is possible to improve the dielectric strength of the printed circuit board.

The insulating portion in the present disclosure insulates the primary side antenna from the secondary side antenna with a printed circuit board. Therefore, in the insulating portion in the present disclosure, direct current insulation voltage of 1000 V or more is possible. Further, there are advantages of being capable of performing bidirectional communication and electric power transmission and it is possible to reduce the cost.

(Regarding Cell Balance)

In the present disclosure, the voltage balance between the above-mentioned plurality of power storage modules MOD1 to MODn (hereinafter, referred to simply as the module balance) is controlled. Specifically, by controlling the inter-module balance, uniform output voltage of the power storage modules is achieved. Normally, because each power storage module includes many battery cells, variability between power storage modules is large as compared with the voltage balance between battery cells in the power storage module (hereinafter, referred to simply as the cell balance). Therefore, also in the case where the cell balance in the power storage module is controlled, it is meaningful to control the module balance.

Figure 11A:
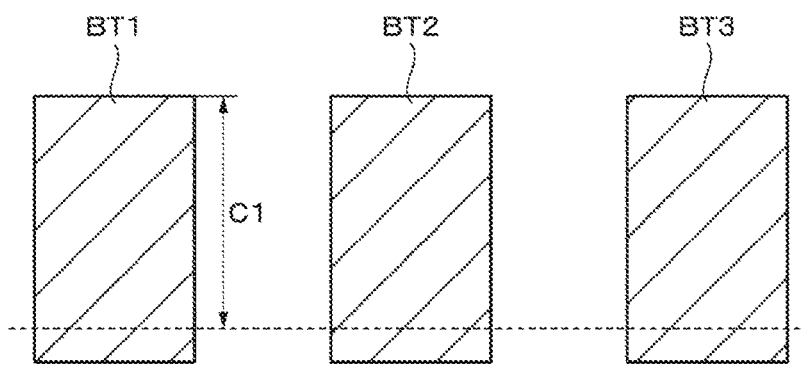
FIGS. 11(A), 11(B) and 11(C) A schematic diagram for describing the necessity of bottom balance.
Figure 11B:
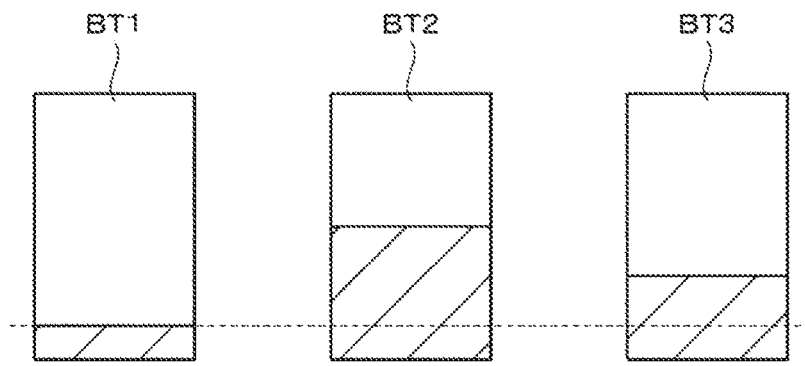
Figure 11C:
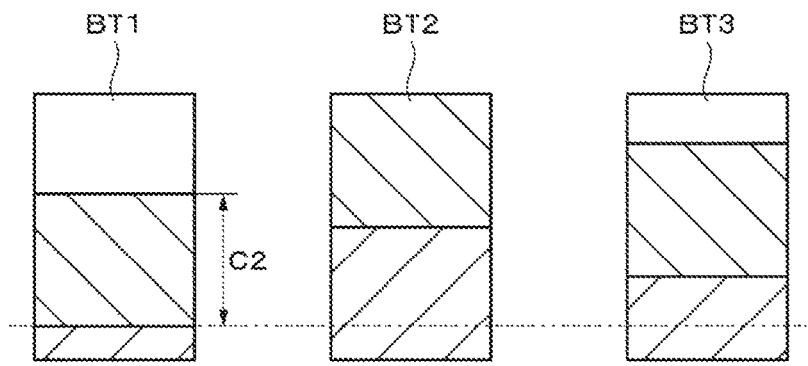

Prior to description of the present disclosure, general cell balance control will be described. As shown in FIGS. 11(A), 11(B) and 11(C), the cell balance between three battery cells BT1, BT2, and BT3 will be considered. First, assumption is made that all battery cells are fully charged as shown in FIG. 11(A). Next, assumption is made that the battery cells are discharged, variability of the amount of discharge is generated, and the voltage of the battery cell BT1 reaches the use lower limit voltage represented by broken lines, as shown in FIG. 11(B). Due to the variability between battery cells, the other battery cells BT2 and BT3 have not reached the use lower limit voltage yet. For example, the difference of the amount of self-discharge is a cause of the variability of the amount of discharge between the battery cells.

When charging is started in this state, the battery cell BT2 that has the largest remaining capacity at the time when the voltage of the battery cell BT1 reaches the use lower limit voltage reaches the full capacity first. At this point, as shown in FIG. 11(C), the battery cell BT1 is not charged to the full capacity. Therefore, although an amount of discharge C1 is supposed to be discharged when it is fully charged, the amount of discharge is reduced to an amount of discharge C2.

Figure 12A:
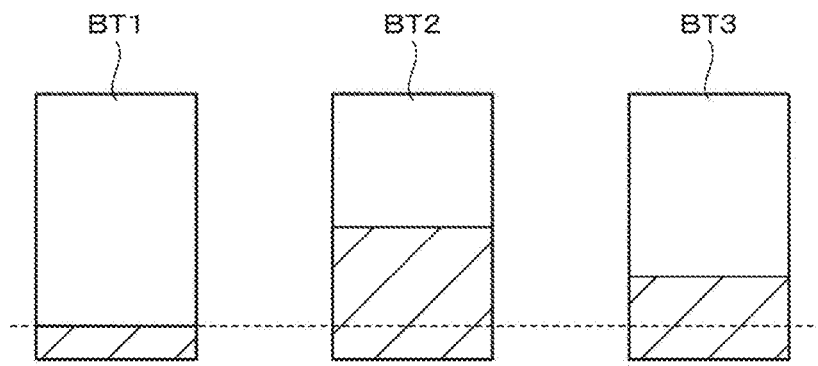
FIGS. 12(A), 12(B) and 12(C) A schematic diagram for describing an active bottom cell balance operation.
Figure 12B:
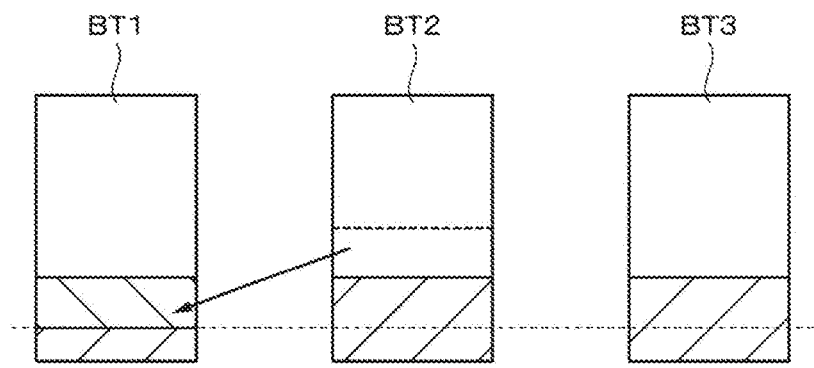
Figure 12C:
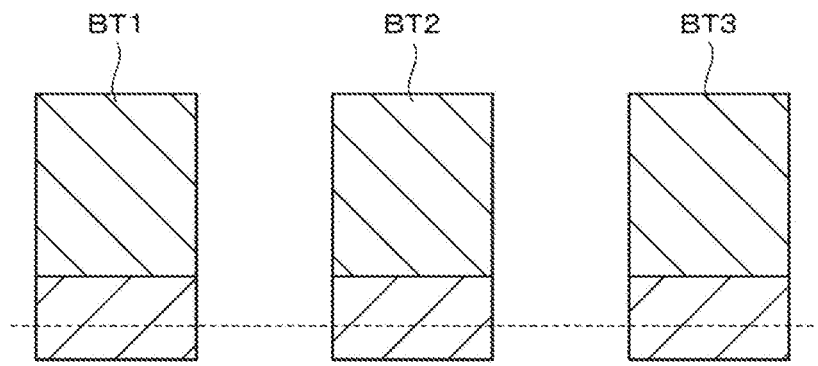

In order to solve this problem, as shown in FIG. 12(A) and FIG. 12(B), electric power is transferred from the battery cell BT2 that has the largest remaining capacity (highest potential) at the time when the battery cell BT1 reaches the use lower limit voltage to the battery cell BT1 that has the least remaining capacity (least potential) to make the remaining capacities substantially equal. Then, the battery cells BT1, BT2, and BT3 are charged. Accordingly, it is possible to charge the three battery cells to substantially the full charge voltage. Actually, processing is repeatedly performed a plurality of times.

Such control is referred to as the active bottom cell balance control. With the bottom cell balance control, it is possible to prevent the amount of discharge from being reduced. The method of discharging the battery cells BT2 and BT3 so that the potential matches that of the battery cell BT1 having the lowest potential in the state shown in FIG. 12(A) is referred to as the passive bottom cell balance control. The active method is favorable because it is capable of effectively using the capacity as compared with the passive method.

Figure 13A:
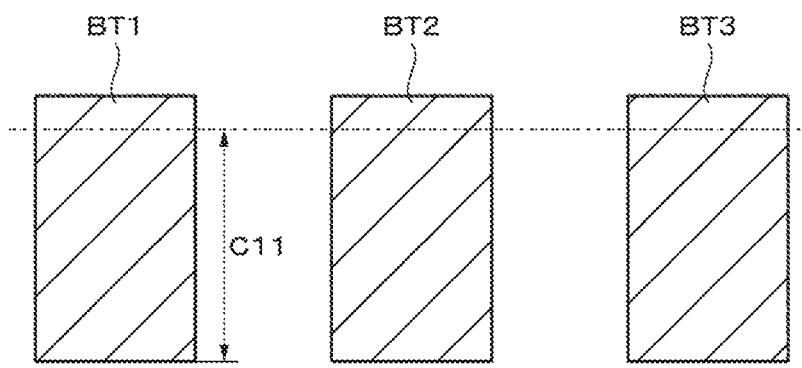
FIGS. 13(A), 13(B) and 13(C) A schematic diagram for describing the necessity of top balance.
Figure 13B:
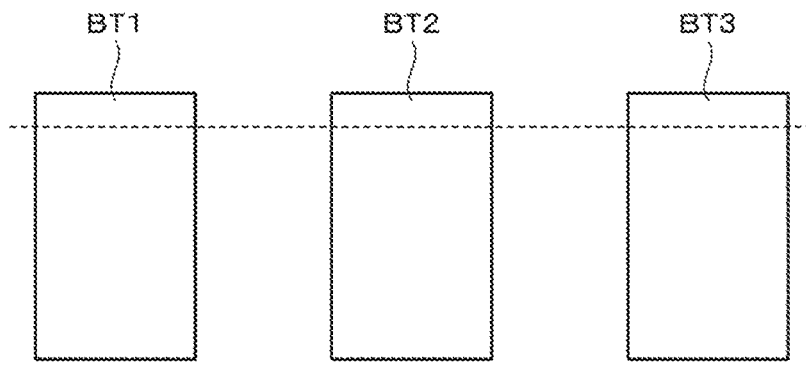

Active top balance control will be described with reference to FIGS. 13(A), 13(B) and 13(C) and FIG. 14 FIGS. 14(A), 14(B) and 14(C). First, assumption is made that all battery cells are fully charged as shown in FIG. 13(A). Next, assumption is made that the battery cells are discharged as shown in FIG. 13(B).

Figure 13C:
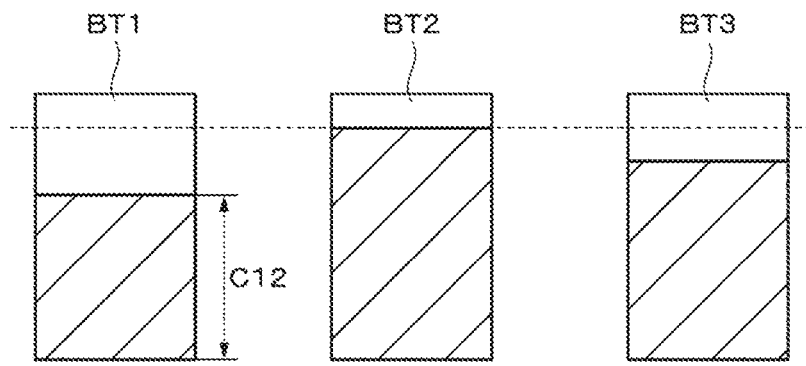

When charging is started, the voltage of the battery cell BT2 reaches the use upper limit voltage first, as shown in FIG. 13(C). At this point, the voltage of the battery cells BT1 and BT3 has not reached the use upper limit voltage. Therefore, the amount of charge is reduced to an amount represented by C12 as compared with an amount of charge C11 (FIG. 13(A)).

Figure 14A:
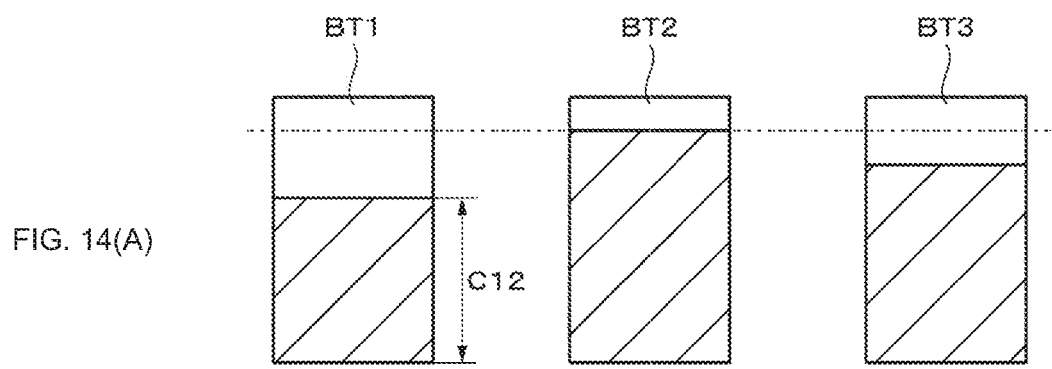
FIGS. 14(A), 14(B) and 14(C) A schematic diagram for describing an active top cell balance operation.
Figure 14B:
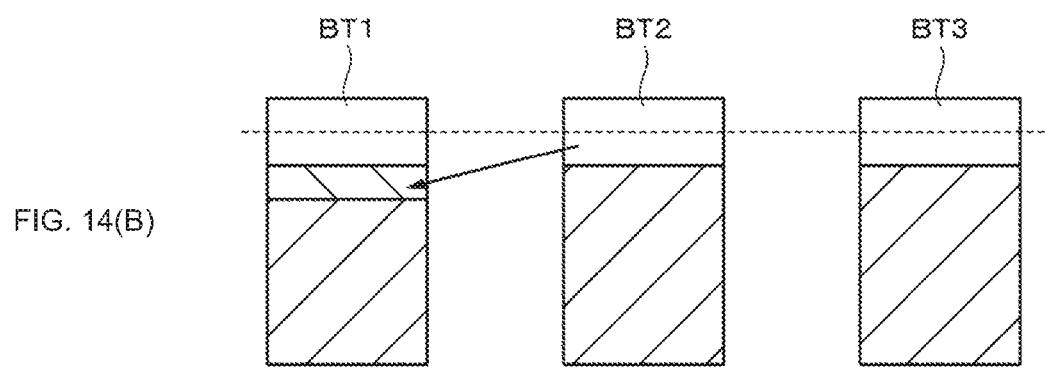
Figure 14C:
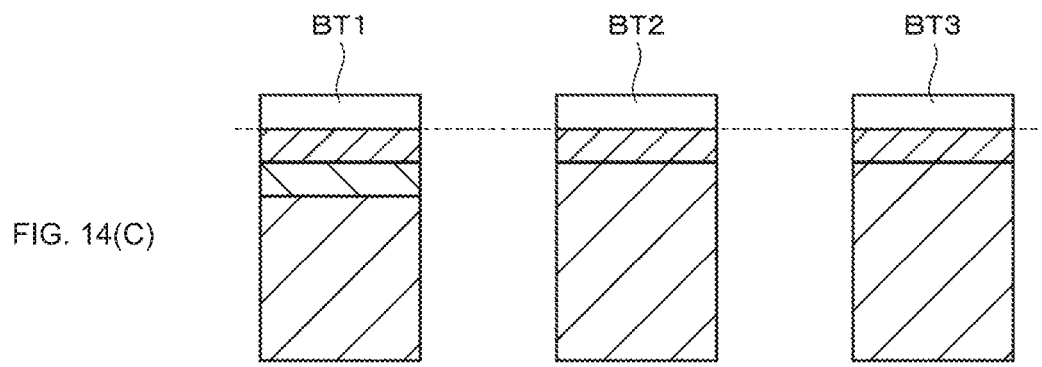

In order to solve this problem, as shown in FIG. 14(A) and FIG. 14(B), electric power is transferred from the battery cell BT2 that has the largest capacity (highest potential) at the time when the battery cell BT2 reaches the use upper limit voltage to the battery cell BT1 that has the least capacity (least potential) to make the remaining capacities substantially equal. Then, the battery cells BT1, BT2, and BT3 are charged. Accordingly, it is possible to charge the three battery cells to substantially the full charge voltage. Actually, processing is repeatedly performed a plurality of times.

Such control is referred to as the active top cell balance control. With the top cell balance control, it is possible to prevent the amount of charge from being reduced. The method of discharging the battery cells BT2 and BT3 so that the potential matches that of the battery cell BT1 having the lowest potential in the state shown in FIG. 14(A) is referred to as the passive top cell balance control. The active method is favorable because it is capable of effectively using the capacity as compared with the passive method.

(Existing Cell Balance Control Circuit)

An example of the existing active bottom cell balance circuit that uses a flyback transformer will be described with reference to FIGS. 15(A) and 15(B) and FIGS. 16(A), 16(B), 16(C) and 16(D). The cathode and anode of each battery cell are connected to both ends of respective primary side coils W1 to W6. The cathode and anode of series connection of six battery cells BT1 to BT6 and both ends of a secondary side coil W0 are connected to each other. Further, a common magnetic core M is provided. Further, a secondary side switch S0 is connected to the secondary side coil W0 in series, and primary side switches S1 to S6 are respectively connected to the primary side coils W1 to W6 in series. The switches S0 to S6 are each formed of a MOS (Metal Oxide Semiconductor) FET, for example.

Figure 15B:
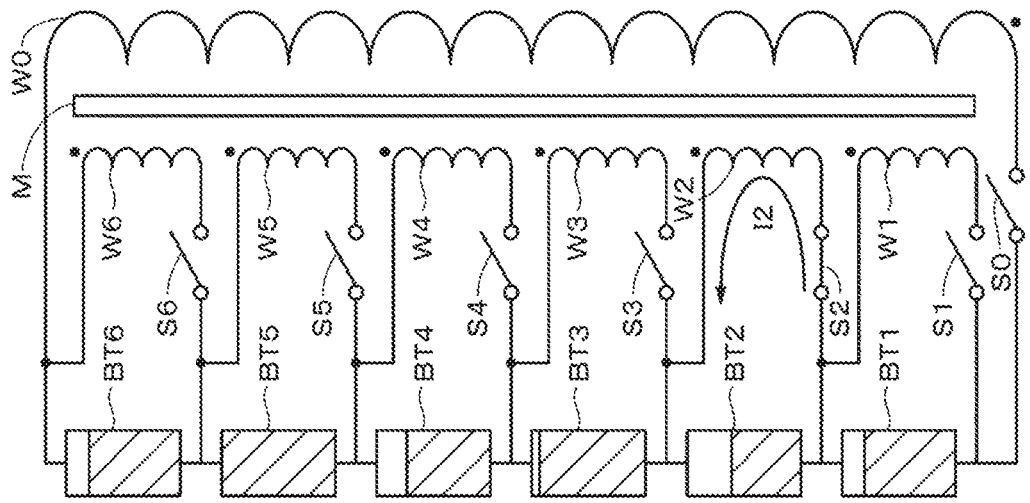
FIGS. 15(A) and 15(B) A connection diagram of the existing active bottom cell balance circuit.
Figure 15A:
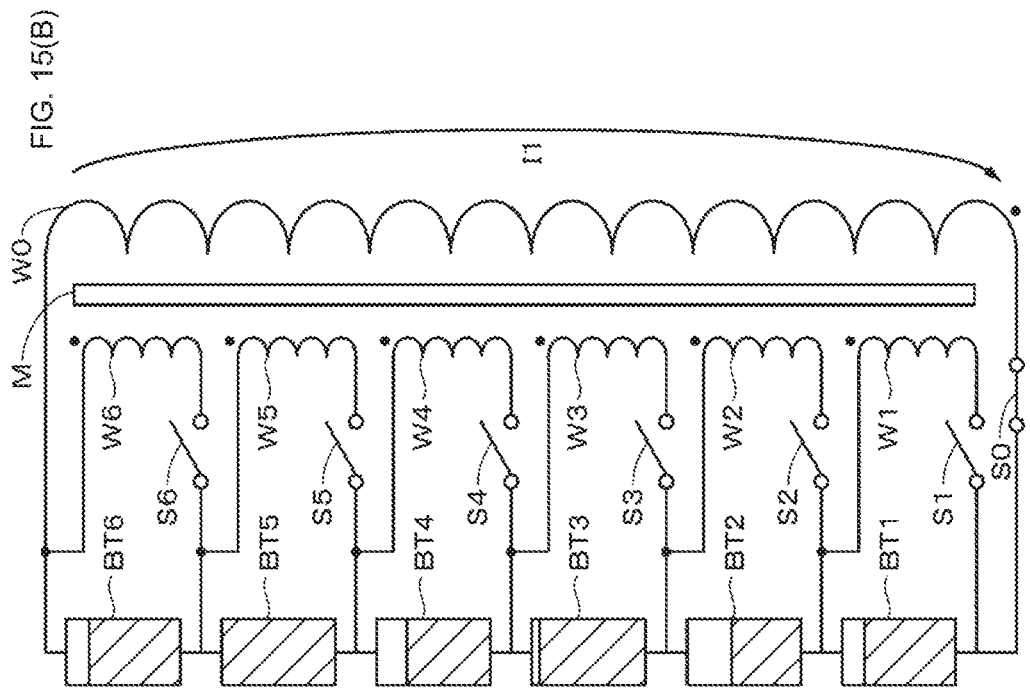
Figure 16A:
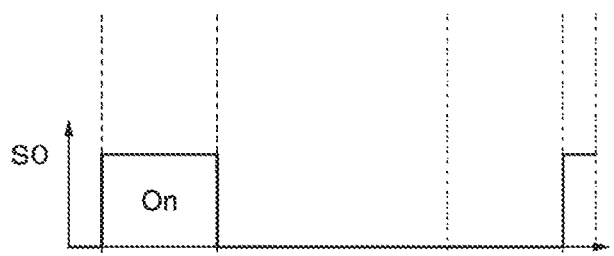
FIGS. 16(A), 16(B), 16(C) and 16(D) A timing chart for describing an operation of the existing active bottom cell balance circuit.
Figure 16B:
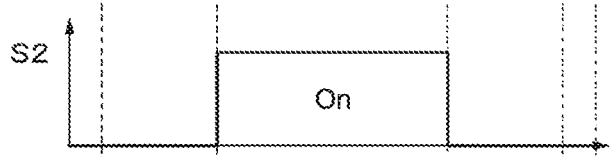
Figure 16C:

FIGS. 16(A), 16(B), 16(C) and 16(D) are timing chart of the operation of the active bottom cell balance circuit shown in FIGS. 15(A) and 15(B). As an example, the voltage of each of the battery cells BT1 to BT6 is detected by a monitoring unit (not shown), and it is detected that the voltage of the battery cell BT2 is the lowest. In this case, electric power is transferred from another battery cell to the battery cell BT2. First, as shown in FIG. 15(A) and FIG. 16(A), the switch S0 is turned on, current I1 flows through the coil W0 as shown in FIG. 16(C), and the magnetic core M is magnetized.

Figure 16D:
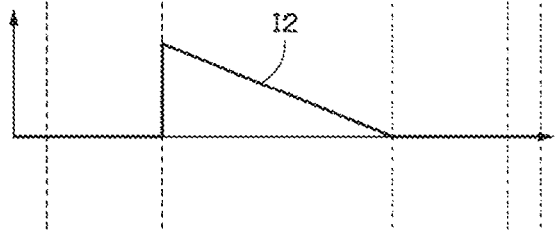

Next, the primary side switch S2 connected to the coil W2 in series is turned on as shown in FIG. 15(B) and FIG. 16(B), and the secondary side switch S0 is turned off as shown in FIG. 16(A). The electromagnetic energy of the magnetic core M is released, and current I2 flows through the primary side coil W2 as shown in FIG. 16(D). This current I2 flows in the battery cell BT2, and thus, the battery cell BT2 is charged.

After that, the primary side switch S2 is turned off as shown in FIG. 16(B). Further, it is followed by a predetermined pause time. The above-mentioned on time of the secondary side switch S0, the on time of the primary side switch S2, and the pause time correspond to a cycle period, and the operation is repeated with the cycle period.

An example of the existing active top cell balance circuit will be described with reference to FIGS. 17(A) and 17(B) and FIGS. 18(A), 18(B), 18(C) and 18(D). The cathode and anode of each battery cell are connected to both ends of the respective primary side coils W1 to W6. The cathode and anode of series connection of the six battery cells BT1 to BT6 and both ends of the secondary side coil W0 are connected to each other. Further, the common magnetic core M is provided. Further, the primary side switches S1 to S6 are respectively connected to the primary side coils W1 to W6 in series, and the secondary side switch S0 is connected to the secondary side coil W0 in series. The switches S0 to S6 are each formed of a MOSFET, for example.

Figure 17B:
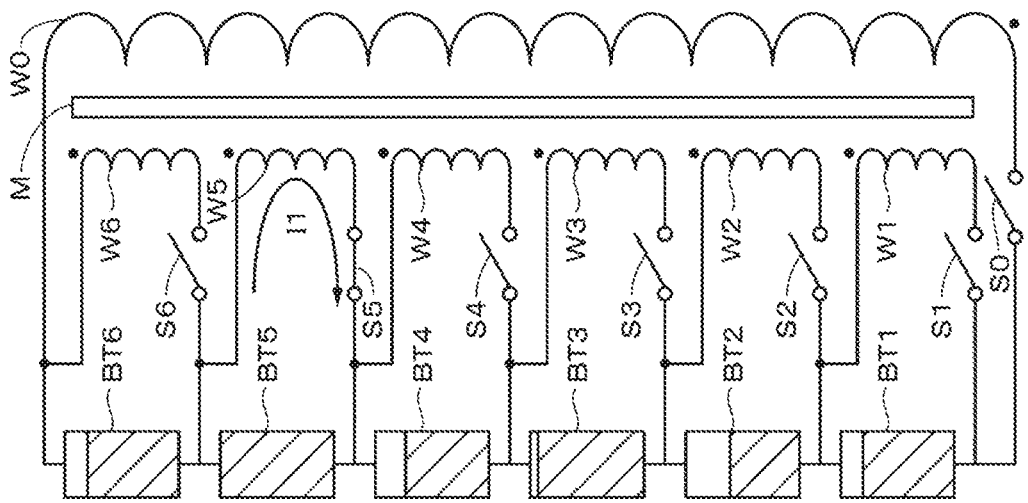
FIGS. 17(A) and 17(B) A connection diagram of the existing active top cell balance circuit.
Figure 17A:
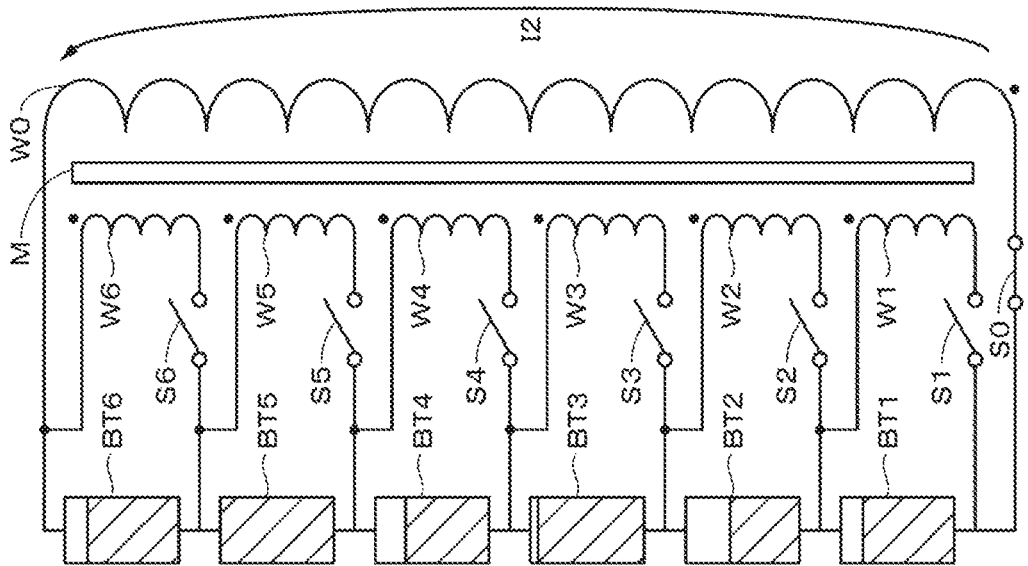
Figure 18A:
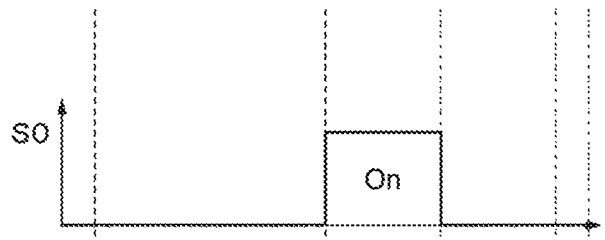
FIGS. 18(A), 18(B), 18(C) and 18(D) A timing chart for describing an operation of the existing active top cell balance circuit.
Figure 18B:
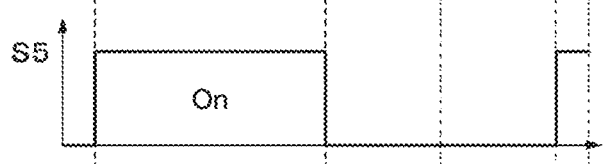
Figure 18C:
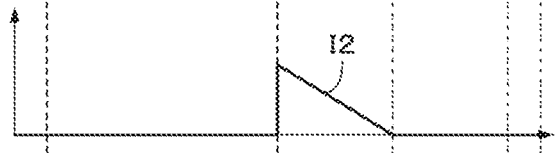
Figure 18D:
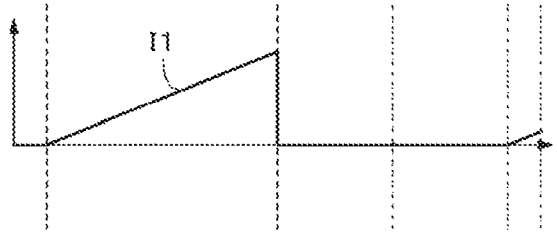

FIGS. 18(A), 18(B), 18(C) and 18(D) are timing chart of the operation of the active top cell balance circuit shown in FIGS. 17(A) and 17(B). As an example, the voltage of each of the battery cells BT1 to BT6 is detected by a monitoring unit (not shown), and it is detected that the voltage of the battery cell BT5 is the highest. In this case, electric power is transferred from the battery cell BT5 to another battery cell. First, as shown in FIG. 17(A) and FIG. 18(B), the switch S5 is turned on, the current I1 flows through the coil W5 as shown in FIG. 18(D), and the magnetic core M is magnetized.

Next, the secondary side switch S0 is turned on as shown in FIG. 17(B) and FIG. 18(A), and the primary side switch S5 is turned off as shown in FIG. 18(B). With the electromagnetic energy of the magnetic core M, the current I2 flows through the secondary side coil W0 as shown in FIG. 18(C). This current I2 flows in the series connection of the battery cells BT1 to BT6, and electric power is distributed to each battery cell.

After that, the secondary side switch S0 is turned off as shown in FIG. 18(A). Further, it is followed by a predetermined pause time. The above-mentioned on time of the primary side switch S5, the on time of the secondary side switch S0, and the pause time correspond to a cycle period, and the operation is repeated with the cycle period.

(Existing Inter-Module Balance Circuit)

The above-mentioned existing balance circuit relates to a battery cell. In the case where it is applied to the inter-module balance described with reference to FIG. 1 to FIG. 6, a problem occurs. Note that the inter-module balance represents the balance of the voltage of the battery unit including a plurality of battery cells or a plurality of battery blocks in power storage modules. Typically, the inter-module unbalance has a value larger than that of the unbalance in a module. Although the inter-module unbalance can be eliminated as a result of balance control of each power storage module, it takes longer time for processing. Note that the inter-module balance control and the above-mentioned existing cell balance control may be used together. In this case, as an example, the inter-module balance control is performed first and then the balance control in the module is performed.

Figure 19:
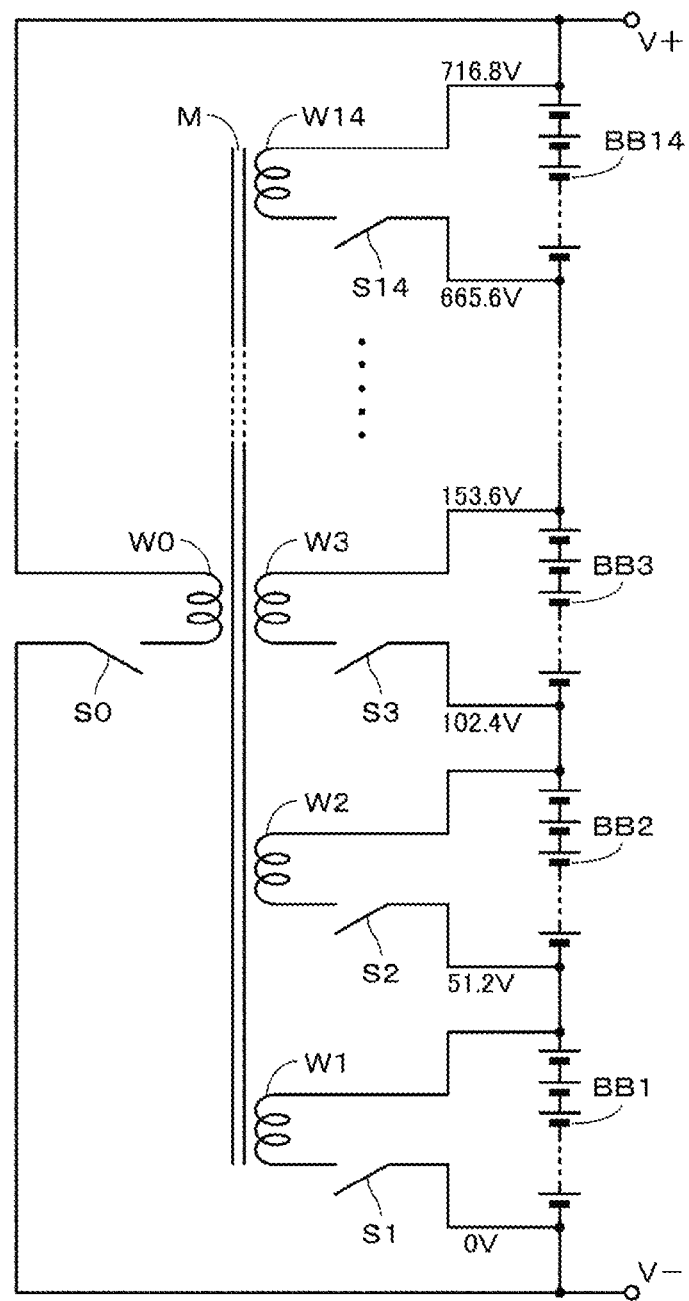
FIG. 19 A connection diagram of an example of the existing inter-module balance circuit.

The configuration in which the existing cell balance circuit is applied to an active inter-module balance circuit with no change is shown in FIG. 19. For example, balance control between 14 modules is performed. The battery block groups BB1 to BB14 are connected in series. Each battery block group has a configuration in which eight battery cells are connected in parallel and 16 parallel connections (battery blocks) of eight battery cells are connected in series (so-called (8P16S)). For example, one battery block group generates voltage of (3.2V×16=51.2V). Therefore, the series connection of the 14 battery block groups BB1 to BB14 generates voltage of (51.2V×14=716.8V).

The cathode side and the anode side of the series connection of the 14 battery block groups are connected to both ends of the secondary side coil W0. Further, the common magnetic core M is provided. Further, the secondary side switch S0 is connected to the secondary side coil W0 in series, and primary side switches S1 to S14 are respectively connected to primary side coils W1 to W14 in series. The switches S0 to S14 are each formed of a MOSFET, for example.

In the active bottom cell balance operation in the configuration shown in FIG. 19, the switch S0 is turned on and the magnetic core M is magnetized with current that flows through the secondary side coil W0. Next, the primary side switch of the power storage module having the lowest voltage is turned on, and the battery block group of the power storage module is charged with the electromagnetic energy transmitted to the primary side coil. As an example, in the case where the voltage of the battery block group BB2 is 32.0 V and the voltage of another battery block group is 32.6 V, the secondary side switch S0 is turned on for a predetermined time before the switch S0 is turned off and the primary side switch S2 of the battery block group BB2 is turned on. With the current that flows through the primary side coil W2, the battery block group BB2 is charged.

In the active top cell balance operation in the configuration shown in FIG. 19, the switch connected to the primary side coil of the battery block group having the highest voltage is turned on. Next, the switch is turned off and the switch S0 is turned on, thereby causing current to flow through the secondary side coil W0 to charge the battery block groups BB1 to BB14. As an example, in the case where the voltage of the battery block group BB2 is 56.5 V and the voltage of another battery block group is 55.9 V, the primary side switch S2 is turned on for a predetermined time before the switch S2 is turned off and the secondary side switch S0 is turned on. With the current that flows through the secondary side coil W0, the battery block groups BB1 to BB14 are charged.

In the configuration shown in FIG. 19, because the magnetic core M of the transformer is commonly used, it is difficult to house a plurality of power storage modules, e.g., 14 power storage modules in separate enclosures, and configured them. In this case, a transformer component including a magnetic core, a coil, and a switch is housed in another enclosure different from that of the 14 power storage modules to configure a transfer apparatus. The 14 power storage modules are connected in a star-like form with this transformer apparatus as a center. Such a star-like configuration has such a problem that the star-like wiring is complicated when the number of power storage modules is large.

(Problem of Existing Inter-Module Balance Circuit)

In the configuration shown in FIG. 19, voltage of 716.8 V is applied to the series circuit of the secondary side coil W0 and the switch S0 by the 14 battery block groups connected in series. Because the pressure resistance necessary for actual use is approximately three times of applied voltage, the pressure resistance of the semiconductor switching element such as FET, which constitutes the switch S0, is 2000 V or more. It is difficult to achieve the configuration shown in FIG. 19, which needs a semiconductor switching element having such pressure resistance.

Figure 20:
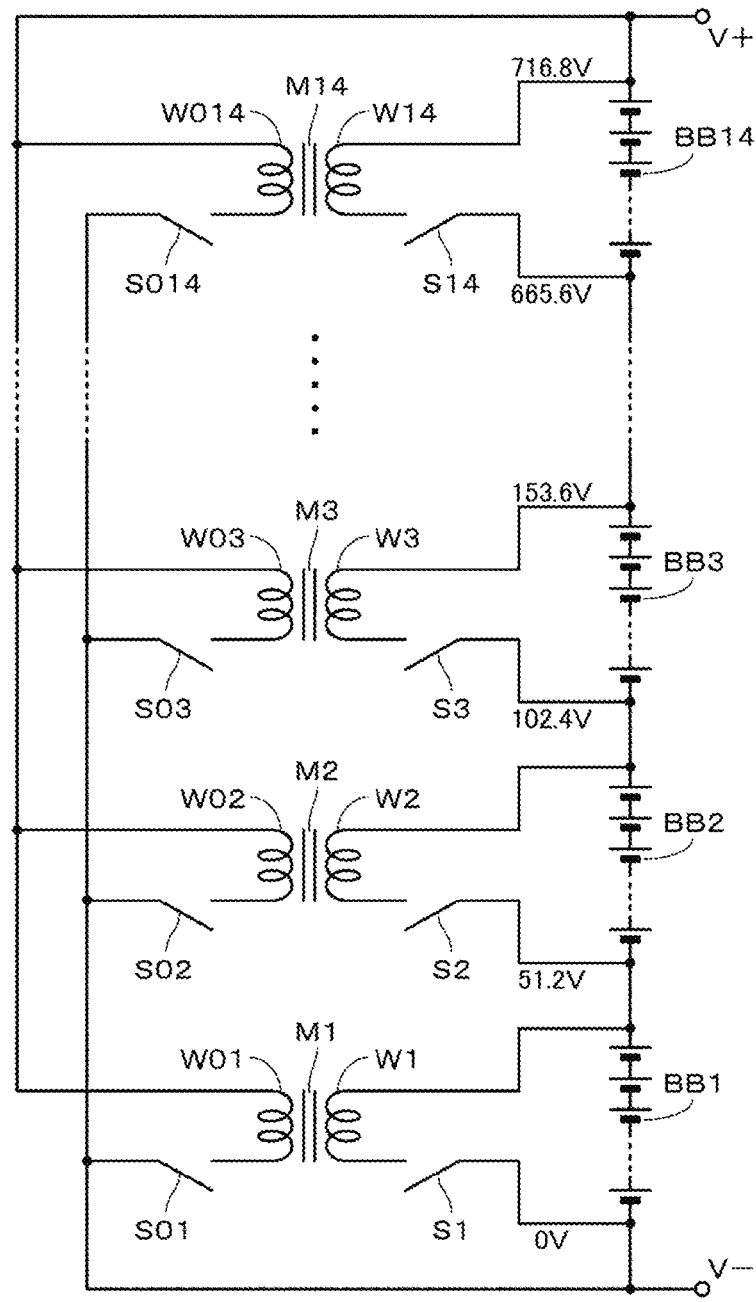
FIG. 20 A connection diagram of an example of the inter-module balance circuit.

As shown in FIG. 20, the magnetic core M is divided into 14 magnetic cores M1 to M14, and the secondary side coil W0 is divided into 14 secondary side coils W01 to W014. In this way, it is possible to separately house the 14 power storage modules in enclosures. In the configuration shown in FIG. 20, voltage of 716.8 V is applied to each of the primary side switches S01 to S014. However, in the configuration shown in FIG. 20, flyback transformers are separately configured, also the primary side switch and the secondary side switch thereof are connected to the respective coils, and it is possible to independently control the switching operation. Therefore, as will be described later, it is possible to perform control such as taking out electric power from a plurality of battery block groups in parallel and supplying electric power to a plurality of battery block groups in parallel. Furthermore, by controlling the length of the on time of the switching operation, it is possible to control the amount of electric power.

(Previously Proposed Inter-Module Balance Circuit)

Figure 21:
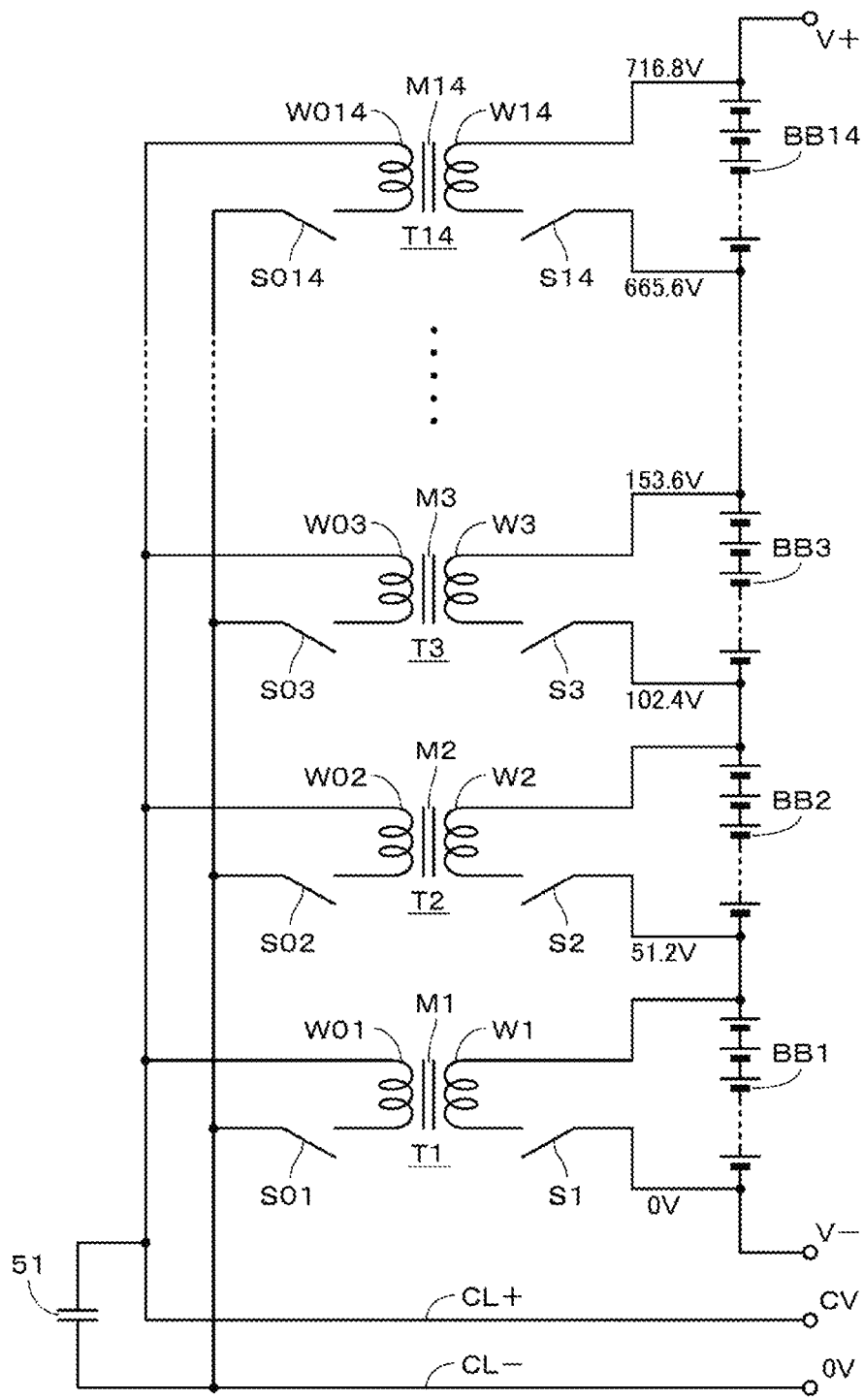
FIG. 21 A connection diagram of a first example of an inter-module balance circuit in the present disclosure.

As shown in FIG. 21, in the previously proposed configuration (see Japanese Patent Application Laid-open No. 2013-051856), a primary side coil W1, a secondary side coil W01, and a magnetic core M1 constitute a flyback transformer T1. The primary side coil W1 and the switch S1 are connected in series, and the secondary side coil W01 and the switch S01 are connected in series. Similarly, primary side coils W2 to W14, secondary side coils W02 to W014, and magnetic cores M2 to M14 respectively constitute flyback transformers T2 to T14. The primary side coils W2 to W14 and the switches S2 to S14 are respectively connected in series. The secondary side coils W02 to W014 and the switches S02 to S014 are respectively connected in series.

The series circuit of the primary side coil W1 and the switch S1 of the flyback transformer T1 is connected to the positive side and the negative side of the battery block group BB1 of the power storage module. The series circuits of the other primary side coils W2 to W14 and the switches S2 to S14 are respectively connected to the positive side and the negative side of the battery block groups BB2 to BB14 of the power storage modules.

A power storage element 51 is provided, and the power storage element 51 generates common power source voltage CV. The common power source voltage CV is voltage lower than 716.8 V of the total voltage of the series connection of the battery block group. Favorably, it is set to be not more than the voltage of substantially one third of the pressure resistance of the secondary side switch. For example, it is set to be a value substantially equal to the unit voltage (51.2 V) of the battery block group. The potential of the common power source voltage CV is controlled by controlling the total discharge current and the total charge current so that it does not over flow, is not exhausted, and is desired voltage.

The power storage element 51 is, for example, a battery or capacitor. With the power storage element 51, one common power source line CL+ is the common power source voltage CV and the other common power source line CL− is 0 V. The common power source line CL− is another power supply that is not connected to a power source (V−) of series connection of the battery block groups of a plurality of power storage modules. Note that the common power source line CL− may be connected to the power source V−. One ends of the divided secondary side coils W01 to W014 are connected to the common power source line CL+, and the other ends of the divided secondary side coils W01 to W014 are respectively connected to the common power source line CL− via the switches S01 to S014.

Figure 22:
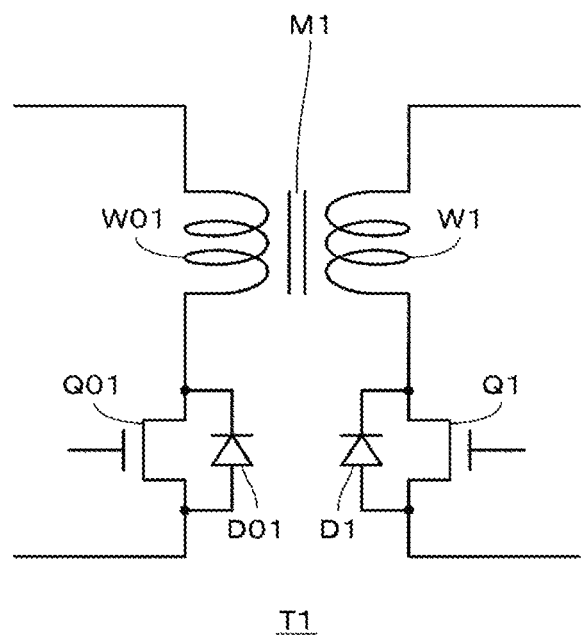
FIG. 22 A connection diagram showing a specific example of a switch.

The switches S0 to S14 and the switches S01 to S014 are each formed of a MOSFET, for example. As shown in FIG. 22, for example, the switch S01 of the flyback transformer T1 is formed of a MOSFET Q01 and a diode D01 connected between the drain and the source of the MOSFET Q01, and the switch S1 is formed of a MOSFET Q1 and a diode D1 connected to the drain and the source of the MOSFET Q1. Turning on/off of the switch is controlled by a control signal from a control unit of the control box ICNT. The control box ICNT receives information on the voltage monitoring result from the module controller CNT of each power storage module, and generates a control signal (pulse signal). Note that instead of the MOSFET, a semiconductor switching element such as an IGBT (Insulated Gate Bipolar Transistor) may be used. Note that through the switch (formed of a MOSFET and a diode connected to the drain and the source of the MOSFET), current automatically flows via the diode without the control signal (automatic turning on of the switch) in the case where the current flows from a source direction to a drain direction.

To the series circuit of the secondary side coils W01 to W014 and the switches S01 to S014, the common power source voltage CV is applied. For example, by setting the common power source voltage CV to the voltage (51.2 V) similar to that applied to the primary side coil and the switch, the pressure resistance of the secondary side switch S01 to S014 can be approximately 154 V. The value of such pressure resistance is not so high for the semiconductor switches constituting the secondary side switches S01 to S014, making it easy to configure the inter-module balance circuit.

In the flyback transformers T1 to T14, the winding ratio of the primary side coil to the secondary side coil is not limited to one, but the phase on the primary side is opposite to the phase on the secondary side. Further, the flyback transformers T1 to T14 are capable of bidirectionally transmitting electric power. Therefore, the representation of the primary side and the secondary side is given for convenience, and it is possible to perform electric power transmission from the primary side to the secondary side and electric power transmission from the secondary side to the primary side.

Taking the flyback transformer T1 as an example, when the switch S1 is turned on from the state where the switches S1 and S01 are off, current flows through the coil W1 and the magnetic core M1 is magnetized. During the period when the switch S1 is turned on, current that increases with time flows through the coil W1. Next, when the switch S1 is turned off and the switch S01 is turned on, current flows through the coil W01 via the switch S01 because the magnetic core is being magnetized. This current is current that decreases with time. The same shall apply to the operation of the other flyback transformers. The flyback transformer has a function as a coupled inductor.

In the active bottom cell balance operation in the configuration shown in FIG. 21, current moves from the battery block group having the highest voltage to the power storage element 51 by controlling the primary side switch. Further, current moves to the battery block group of the power storage module having the lowest voltage by controlling the secondary side switch. As described above, in the inter-module balance circuit according to the present disclosure, current is caused to move via two stages of bidirectional flyback transformers.

As an example, the operation in the case where the voltage of the battery block group BB3 is the highest, i.e., 32.6 V and the voltage of the battery block group BB2 is the lowest, i.e., 32.0 V will be described. First, the switch S3 is turned on, and current flows through the primary side coil W3 of the flyback transformer T3 with the battery block group BB3 as a current source. Next, the switch S3 is turned off and the switch S03 is turned on. By the electromagnetic energy, current flows through the secondary side coil W03, and the power storage element 51 is charged.

Next, the switch S03 is turned off, the switch S02 is turned on, and current flows through the secondary side coil W02 of the flyback transformer T2 by the power storage element 51. Next, the switch S02 is turned off, the switch S2 is turned on, the battery block group BB2 is charged by the current that flows through the primary side coil W2. In this way, the active bottom cell balance operation is performed.

In the active top cell balance operation in the configuration shown in FIG. 21, current moves from the battery block group having the highest voltage to the power storage element 51 by controlling the primary side switch. Further, current moves to the battery block group of the power storage module having the lowest voltage by controlling the secondary side switch. As described above, in the inter-module balance circuit according to the present disclosure, current is caused to move via two stages of bidirectional flyback transformers.

As an example, the operation in the case where the voltage of the battery block group BB3 is the highest, i.e., 56.5 V and the voltage of the battery block group BB2 is the lowest, i.e., 55.9 V will be described. First, the switch S3 of the flyback transformer T3 is turned on, and current flows through the primary side coil W3 with the battery block group BB3 as a current source. Next, the switch S3 is turned off and the switch S03 is turned on. By the electromagnetic energy, current flows through the secondary side coil W03, and the power storage element 51 is charged.

Next, the switch S03 is turned off, the switch S02 of the flyback transformer T2 is turned on, and current flows through the secondary side coil W02 by the power storage element 51. Next, the switch S02 is turned off, the switch S2 is turned on, and the battery block group BB2 is charged by the current that flows through the primary side coil W2. In this way, the active top cell balance operation is performed.

Figure 23:
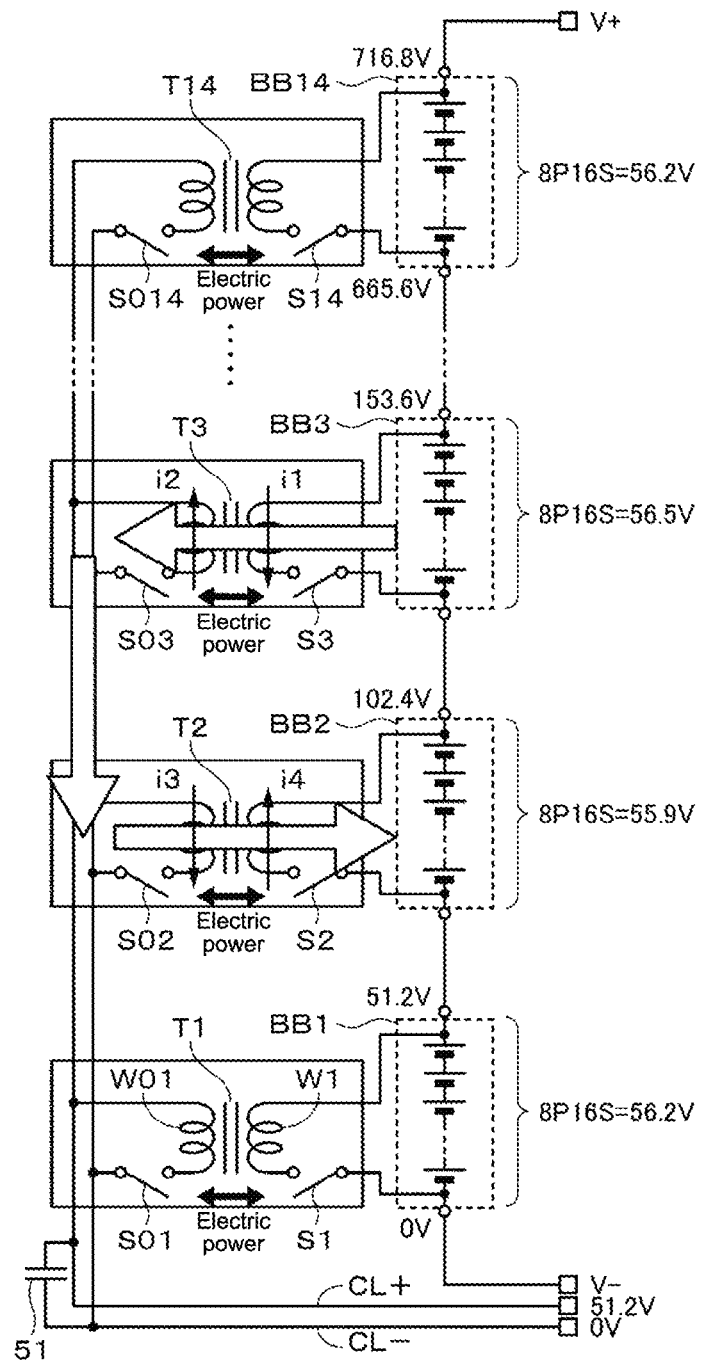
FIG. 23 A connection diagram for describing an operation of a first example of the inter-module balance circuit that is previously proposed.

The active top cell balance operation will be described in more detail with reference to FIG. 23 and FIGS. 24(A), 24(B), 24(C), 24(D), 24(E), 24(F), 24(G) and 24(H). As an example, as shown in FIG. 23, in the voltage relationship between the battery block groups of 14 power storage modules, the voltage of the battery block group BB3 of the power storage module MOD3 is the highest (e.g., 56.5 V), and the voltage of the battery block group BB2 of the power storage module MOD2 is the lowest (e.g., 55.9 V). Further, as shown in FIG. 23, current that flows through the coil W3 of the flyback transformer T3 is denoted by i1 and current that flows through the coil W03 is denoted by i2. The phase of the current i1 and the phase of the current i2 are opposite to each other. Current that flows through the coil W02 of the flyback transformer T2 is denoted by i3, and current that flows through the coil W2 is denoted by i4. The phase of the current i3 and the phase of the current i4 are opposite to each other. Further, assumption is made that the power storage element 51 is sufficiently charged when the operation is started.

Figure 24:
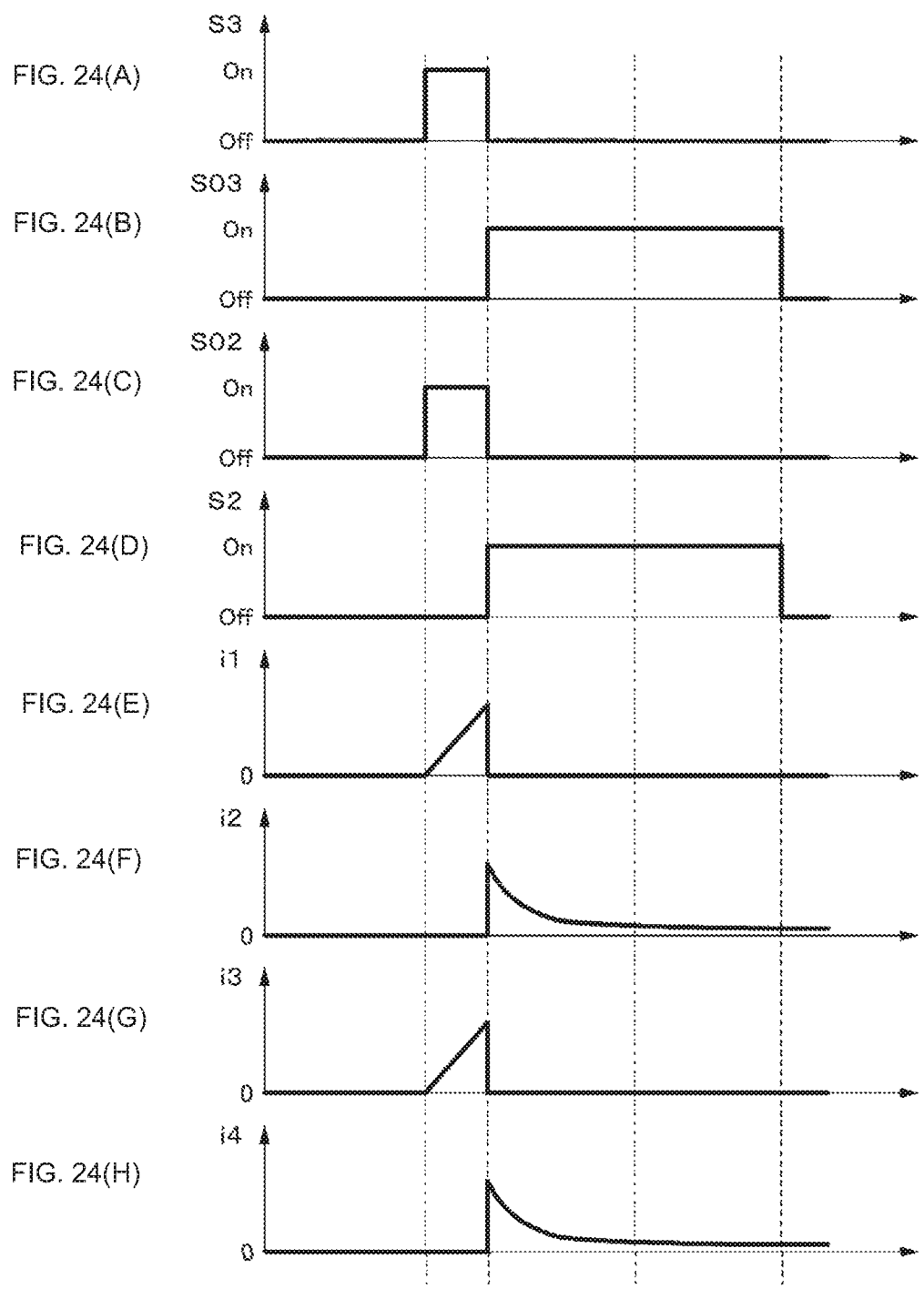
FIGS. 24(A), 24(B), 24(C), 24(D), 24(E), 24(F), 24(G) and 24(H) A timing chart for describing the operation of the first example of the inter-module balance circuit that is previously proposed.

As shown in the timing chart of FIGS. 24(A), 24(B), 24(C), 24(D), 24(E), 24(F), 24(G) and 24(H), electric power transmission via the flyback transformer T3 and electric power transmission via the flyback transformer T2 are performed in parallel. First, as shown in FIG. 24(A) and FIG. 24(C), the switches S3 and S02 are turned on for the same period. By turning on the switch S3, as shown in FIG. 24(E), the current i1 that gradually increases flows through the coil W3. By turning on the switch S02, as shown in FIG. 24(G), the current i3 that gradually increases flows through the coil W02. The current i3 flows through the power storage element 51 in the discharge direction.

Next, the switches S3 and S02 are turned off, and the switches S03 and S2 are turned on for the same period as shown in FIG. 24(B) and FIG. 24(D). By turning on the switch S03, the current i2 that gradually decreases flows through the coil W03 as shown in FIG. 24(F). The current i2 flows through the power storage element 51 in the charge direction. By the charge of the power storage element 51 with the current i2, electric power is caused to move from the battery block group BB3 to the power storage element 51.

By turning on the switch S2, the current i4 that gradually decreases flows through the coil W2 as shown in FIG. 24(H). The current i4 flows through the battery block group BB2 in the charge direction. By the charge with the current i4, electric power of the power storage element 51 is caused to move to the battery block group BB2. Note that actual electric power transmission is performed so that electric power is caused to move little by little not by a single switching operation but multiple switching operations. The cycle of the switching operation is long, e.g., approximately 10 sec. Further, it is possible to set the amount of movement of electric power to a desired amount by performing pulse width modulation on a pulse signal for a switch to control the on-period of the switch. Further, although the switches S3 and S02 are written in a synchronized form in FIGS. 24(A), 24(B), 24(C), 24(D), 24(E), 24(F), 24(G) and 24(H), actually, the synchronization relationship does not necessarily need to be established because the common power source voltage CV allows a certain latitude.

Figure 25:
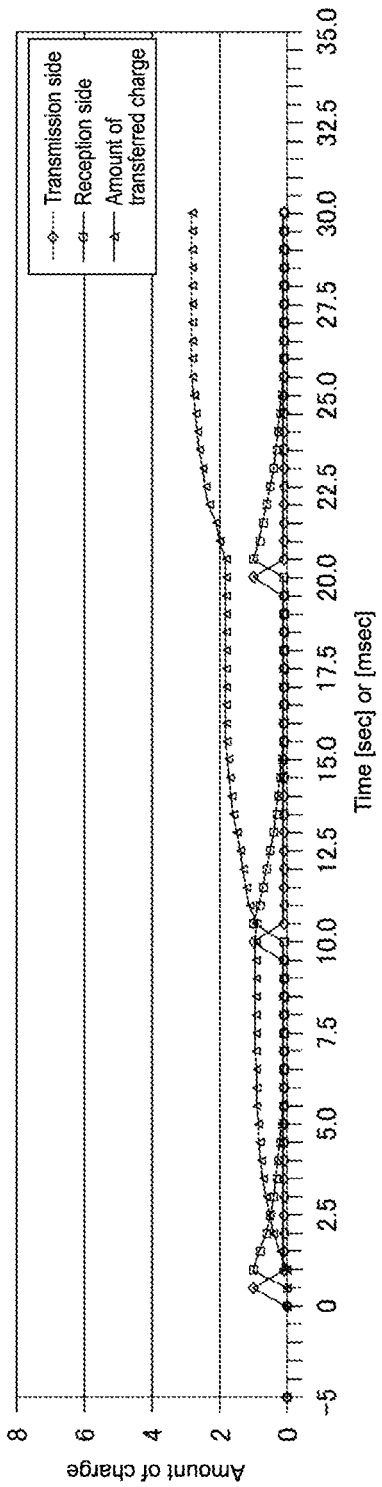
FIG. 25 A timing chart for describing the operation of the first example of the inter-module balance circuit that is previously proposed.

The control box ICNT as a high order controller monitors the voltage of each power storage module, and performs control to stop the inter-module balance control operation when the detected batteries of the power storage modules are equal to each other. Then, in the case where a voltage difference between the power storage modules is generated, the inter-module balance control operation is started. In FIG. 25, movement of charges in the operation of the above-mentioned preliminary proposed power storage apparatus is shown.

(Inter-Module Balance Circuit According to Embodiment of Present Disclosure)

Although an embodiment of the present disclosure has a configuration similar to that of the preliminary proposed power storage apparatus, the cycle of movement of charges is shorter and the number of times of switching operations for causing charges to move is larger. Specifically, in the preliminary proposed power storage apparatus, in the case where the cell constituting the battery block group uses the above-mentioned cathode material containing a cathode active material having an olivine structure, there is fear that the inter-module balance control is not satisfactorily performed.

Figure 26:
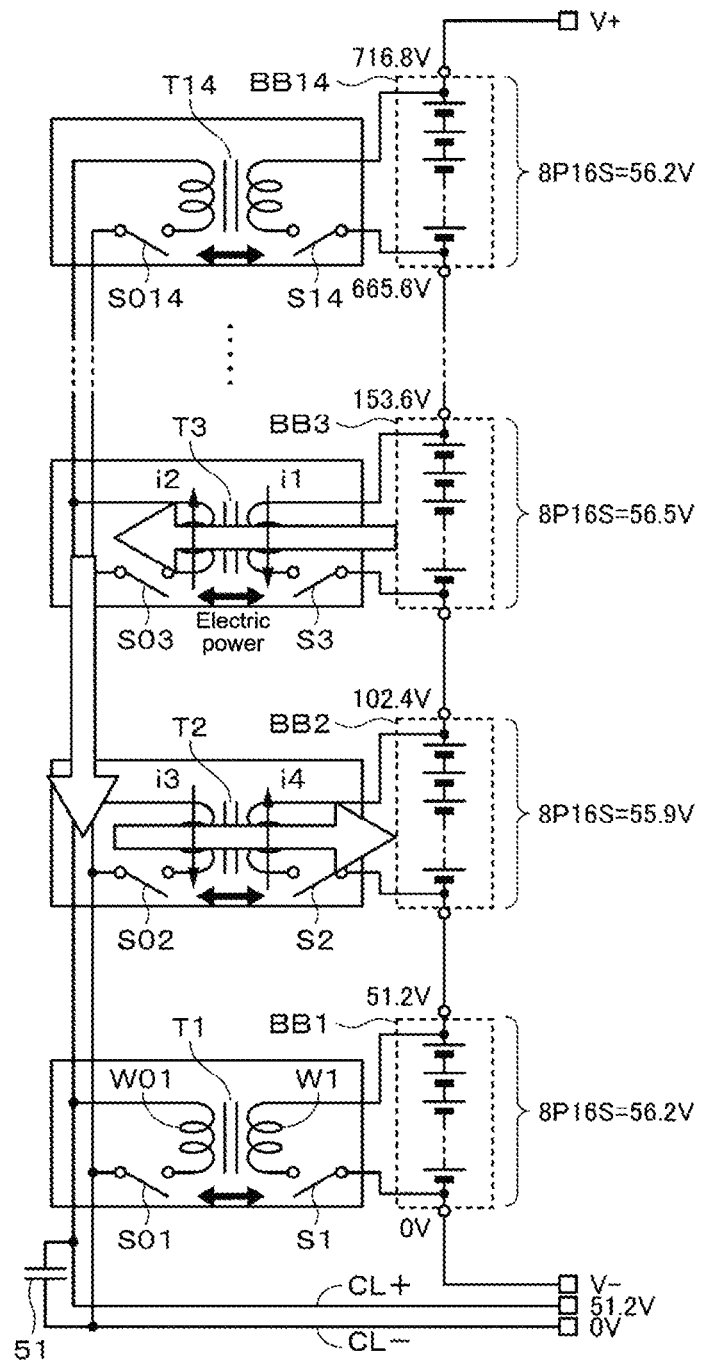
FIG. 26 A connection diagram for describing an operation of a first example of an inter-module balance circuit in the present disclosure.
Figure 27:
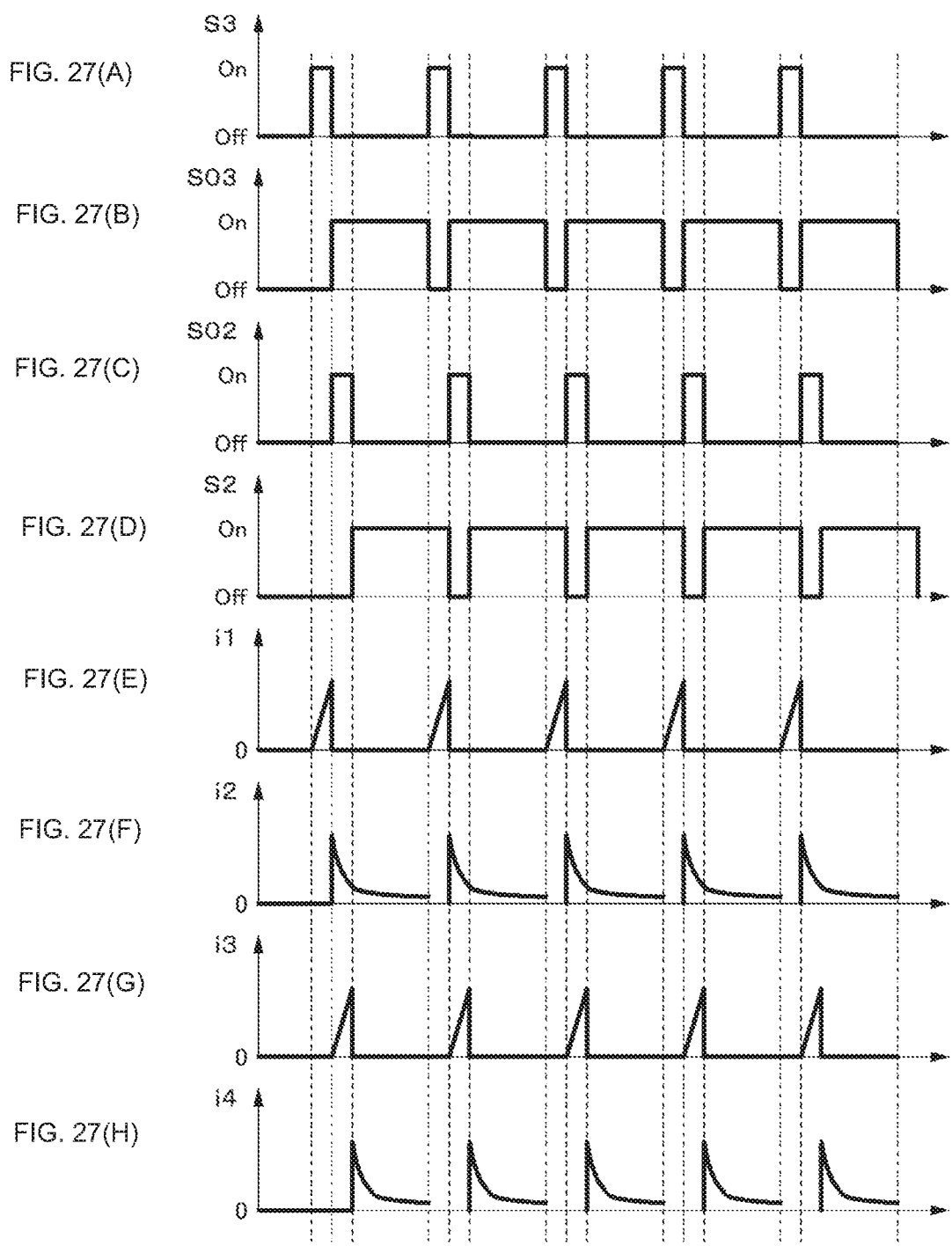
FIGS. 27(A), 27(B), 27(C), 27(D), 27(E), 27(F), 27(G) and 27(H) A timing chart for describing the operation of the first example of the inter-module balance circuit in the present disclosure.

An example of the operation of an embodiment of the present disclosure will be described with reference to FIG. 26 to FIG. 29. FIG. 26 shows the same connection configuration as that shown in FIG. 23. The corresponding components will be denoted by the same reference symbols. As an example, the operation in the case where the voltage of the battery block group BB3 is the highest, i.e., 56.5 V and the voltage of the battery block group BB2 is the lowest, i.e., 55.9 V will be described. First, the switch S3 of the flyback transformer T3 is turned on, and current flows through the primary side coil W3 with the battery block group BB3 as a current source. Next, the switch S3 is turned off and the switch S03 is turned on. By the electromagnetic energy, current flows through the secondary side coil W03 and the power storage element 51 is charged.

Next, the switch S03 is turned off, the switch S02 of the flyback transformer T2 is turned on, and current flows through the secondary side coil W02 by the power storage element 51. Next, the switch S02 is turned off, the switch S2 is turned on, and the battery block group BB2 is charged by the current that flows through the primary side coil W2. In this way, the active top cell balance operation is performed.

The active top cell balance operation will be described in more detail with reference to FIG. 26 and FIGS. 27(A), 27(B), 27(C), 27(D), 27(E), 27(F), 27(G) and 27(H). As an example, as shown in FIG. 26, in the voltage relationship between the battery block groups of 14 power storage modules, the voltage of the battery block group BB3 of the power storage module MOD3 is the highest (e.g., 56.5 V), and the voltage of the battery block group BB2 of the power storage module MOD2 is the lowest (e.g., 55.9V). Further, as shown in FIG. 26, current that flows through the coil W3 of the flyback transformer T3 is denoted by i1 and current that flows through the coil W03 is denoted by i2. The phase of the current i1 and the phase of the current i2 are opposite to each other. Current that flows through the coil W02 of the flyback transformer T2 is denoted by i3, and current that flows through the coil W2 is denoted by i4. The phase of the current i3 and the phase of the current i4 are opposite to each other. Further, assumption is made that the power storage element 51 is sufficiently charged when the operation is started.

As shown in the timing chart of FIGS. 27(A), 27(B), 27(C), 27(D), 27(E), 27(F), 27(G) and 27(H), electric power transmission via the flyback transformer T3 and electric power transmission via the flyback transformer T2 are performed in parallel. First, as shown in FIG. 27(A) and FIG. 27(C), the switches S3 and S02 are turned on for the same period. By turning on the switch S3, as shown in FIG. 27(E), the current i1 that gradually increases flows through the coil W3. By this current i1, the coil absorbs charges. By turning on the switch S02, as shown in FIG. 27(G), the current i3 that gradually increases flows through the coil W02. The current i3 flows through the power storage element 51 in the discharge direction.

Next, the switches S3 and S02 are turned off, and the switches S03 and S2 are turned on for the same period as shown in FIG. 27(B) and FIG. 27(D). By turning on the switch S03, the current i2 that gradually decreases flows through the coil W03 as shown in FIG. 27(F). The current i2 flows through the power storage element 51 in the charge direction. By this current i2, the coil emits charges. By the charge of the power storage element 51 with the current i2, electric power is caused to move from the battery block group BB3 to the power storage element 51.

By turning on the switch S2, the current i4 that gradually decreases flows through the coil W2 as shown in FIG. 27(H). The current i4 flows through the battery block group BB2 in the charge direction. By the charge with the current i4, electric power of the power storage element 51 is caused to move to the battery block group BB2. Note that actual electric power transmission is performed so that electric power is caused to move little by little not by a single switching operation but multiple switching operations. Further, it is possible to set the amount of movement of electric power to a desired amount by performing pulse width modulation on a pulse signal for a switch to control the on-period of the switch. Further, although the switches S3 and S02 are written in a synchronized form in FIGS. 24(A), 24(B), 24(C), 24(D), 24(E), 24(F), 24(G) and 24(H), actually, the synchronization relationship does not necessarily need to be established because the common power source voltage CV allows a certain latitude.

Figure 28:
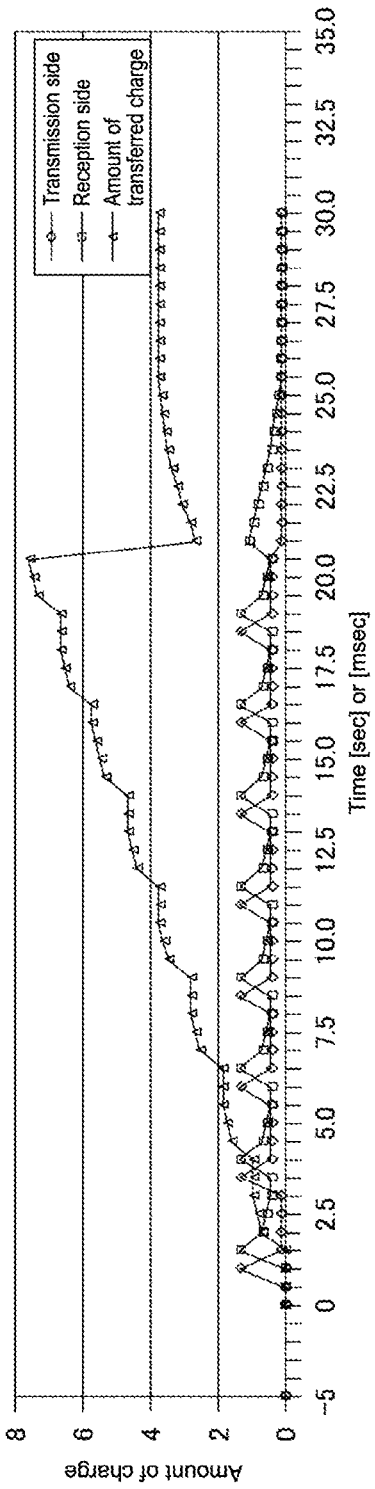
FIG. 28 A timing chart for describing the operation of the first example of the inter-module balance circuit in the present disclosure.
Figure 29:
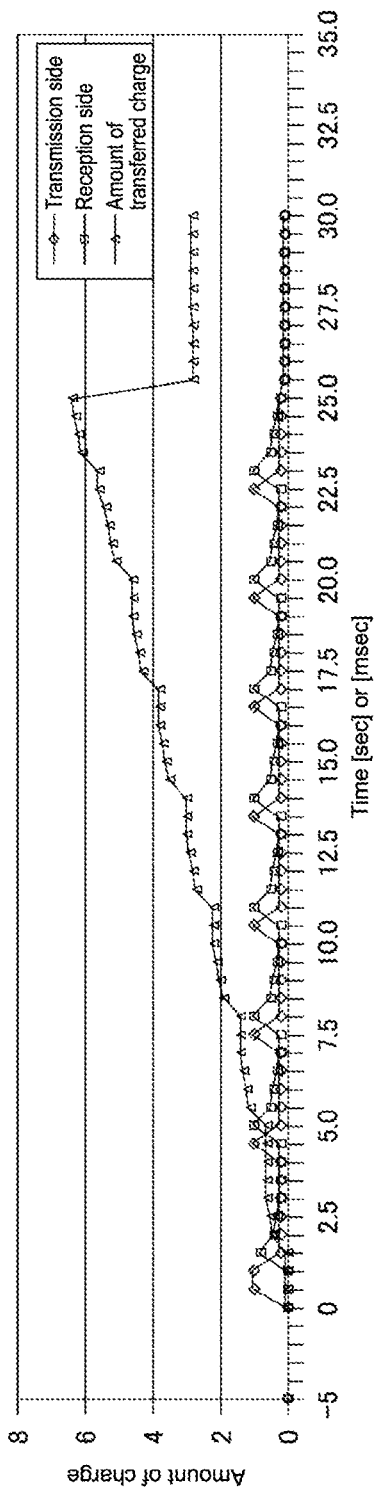
FIG. 29 A timing chart for describing the operation of the first example of the inter-module balance circuit in the present disclosure.

The control box ICNT as a high order controller monitors the voltage of each power storage module, and performs control to stop the inter-module balance control operation when the detected batteries of the power storage modules are equal to each other. Then, in the case where a voltage difference between the power storage modules is generated, the inter-module balance control operation is started. In FIG. 28 and FIG. 29, movement of charges in the operation of the power storage apparatus according to an embodiment of the present disclosure is shown.

Figure 30:
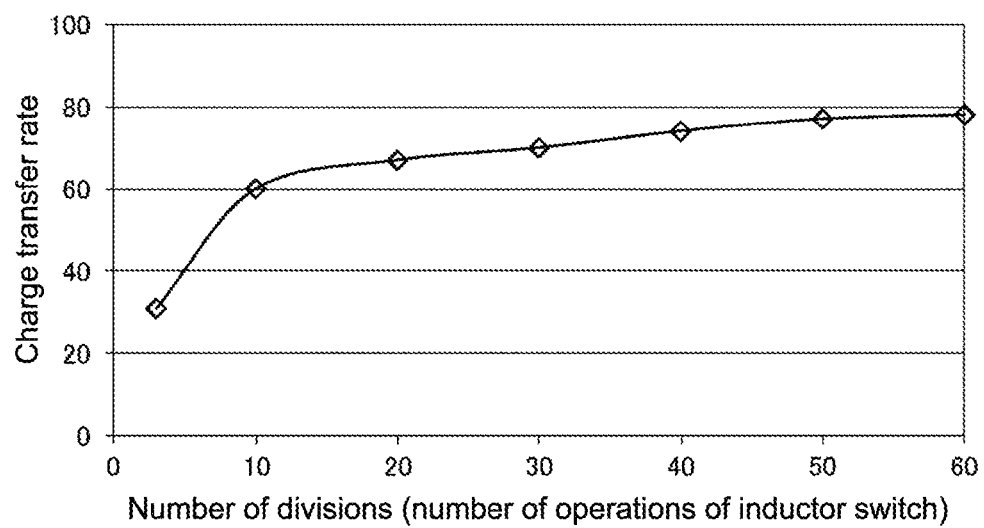
FIG. 30 A graph showing an example of the relationship between the number of divisions and the charge transfer rate.

As can be seen by comparing FIGS. 24(A), 24(B), 24(C), 24(D), 24(E), 24(F), 24(G) and 24(H) and FIGS. 27(A), 27(B), 27(C), 27(D), 27(E), 27(F), 27(G) and 27(H), in an embodiment of the present disclosure, charges are caused to move in a shorter cycle such as approximately 1 sec as compared with that in the preliminary proposed power storage apparatus. Then, as can be seen by comparing FIG. 25, FIG. 28, and FIG. 29, it is possible to increase the slope of the change in movement of charges in the time direction as compared with the case of the preliminary proposed power storage apparatus. Therefore, it is possible to cause charges to move in a short time and shorten the time necessary for the inter-module balance. FIG. 30 is a graph showing an example of the relationship between the number of divisions and the charge transfer rate. It can be seen that the charge transfer rate is low in the preliminary proposed power storage apparatus, because charges are caused to move separately in five times or less. Because the number of divisions is 10 or more, favorably, 30 or more, in the present disclosure, it is possible to increase the charge transfer rate.

Figure 31:
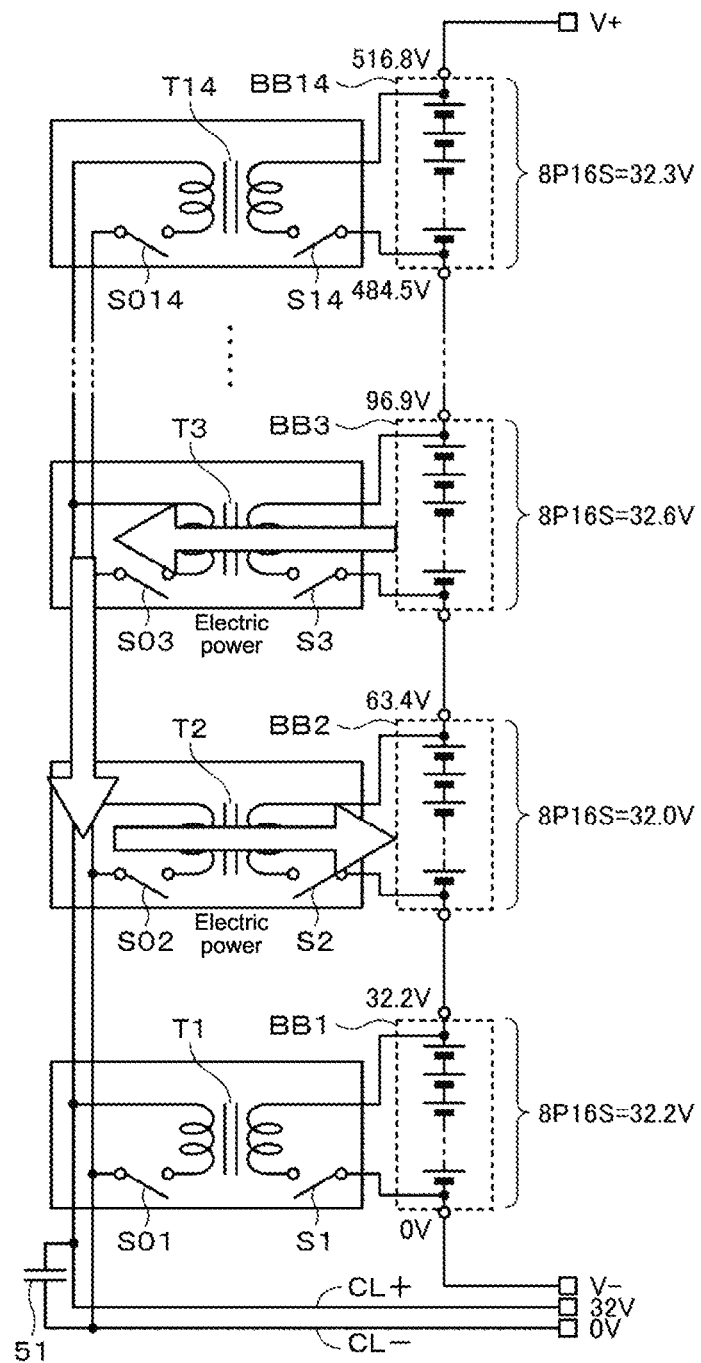
FIG. 31 A connection diagram showing a configuration of the first example of the inter-module balance circuit in the present disclosure in which different voltage is generated.

FIG. 31 shows another example of the value of voltage in an embodiment of the present disclosure. As shown in FIG. 31, in the voltage relationship between the battery block groups of 14 power storage modules, the voltage of the battery block group BB3 of the power storage module MOD3 is the highest (e.g., 32.6 V), and the voltage of the battery block group BB2 of the power storage module MOD2 is the lowest (e.g., 32.0 V). Also in the case of such a voltage relationship, it is possible to control the inter-module balance similarly to the above.

The inter-module balance control in the present disclosure will be described in more detail. In the power storage module in which an olivine cathode-based lithium secondary battery constitutes a battery block group, the slope of the charge and discharge curve is small, there is substantially no voltage difference between cells or assembled batteries in the normal charge and discharge area, and the voltage difference and capacity difference due to the variability of the capacity are extremely small. For example, the change in the charge and discharge curve of the cell is within the range of 3.6 V to 3.0 V and is a flat curve of substantially 3.3 V.

Therefore, when charges of a slight voltage difference and capacity difference are caused to move by using an inductor, it is general to store a small amount of charge in a high voltage element with a capacitor or the like and cause the charge to move, or use an inductor element to move the charge. Note that in the case where the capacitor is used, it needs to take into account the restriction of the upper limit voltage of the storage battery, and it is not generally used in a battery with an olivine type cathode because it needs to control the constant voltage charge circuit due to the charge voltage restriction. In this regard, according to the present disclosure, it is possible to eliminate the necessity of taking the method for causing the inductor to cause charges to move by an efficient and rational operation in a short time in a storage battery having such a flat charge and discharge curve.

Charges are stored in an inductor, caused to move to a power storage module in the initial stage of the time when the switch is turned on, and balanced with the same charge value between the inductor and the power storage module. The time it takes to cause the charges to move is balanced in 1 to 2 sec because the voltage difference between the high-voltage side power storage module and the low-voltage side power storage module is small. After that, the switch of the inductor is turned off because there is no movement of charges. Then, by repeatedly performing the operation of the switching element of the inductor of the high-voltage side power storage module, it is possible to cause a small amount of charge to move from the high-voltage side power storage module to the low-voltage power storage module and balance the voltage. After a series of operations, the module balance circuit operation is stopped at the time when the voltage is substantially the same.

In the power storage module of an olivine cathode-based secondary battery, it needs to perform inter-module balancing when the voltage difference (difference of SOC) is not more than 1 V (2%). In the case where the inter-module balancing is performed with the preliminary proposed balance control, the voltage difference is low, the amount of charge that can move in one inductor balance operation is full charge voltage due to the limitation of the charge conditions of the olivine cathode-based battery, and substantially no current flows. Therefore, actually, substantially no charging is performed. Because such an operation is repeated, no charge is caused to move in the inter-module balance control of the secondary battery having a flat charge and discharge curve in the preliminary proposed control method.

On the other hand, in the inter-module balance control method according to the present disclosure, it is possible to gradually cause charges to move by repeatedly performing an operation in which current is transferred from the low-voltage side module inductor up to close to the charge upper limit voltage in a short time many times in the method of repeatedly turning on and off the inductor switch many times and a small amount of charge is repeatedly caused to move many times even when the voltage difference between modules is small. In the inter-module balance in the present disclosure, by dividing charges of the capacity difference and voltage difference into many times (approximately $\frac{1}{30}$ to $\frac{1}{50}$), it is possible to achieve a practical operation.

As described above, even when the amount of charge to be caused to move is small, it is possible to substantially eliminate the capacity difference and voltage difference between modules, reduce the difference between modules in an olivine cathode-based secondary battery from 1% to not more than 0.3%, and balance the modules by performing the operation many times. Accordingly, it is possible to achieve stable charge and discharge performance with no variability even when the cycle is repeated for a long time. On the other hand, in the preliminary proposed method, there is fear that after several hundred cycles, the voltage/capacity variability is increased, the capacity that can be used is gradually decreased, and erroneous determination is performed as if it has reached a cycle life.

A difference ΔQ of the amount of charge due to the voltage difference regards (difference of 1%=240 mAh) as the difference in a 24 Ah module when it is obtained from a formula in the present disclosure. As a desired value of current I that is caused to flow by an inductor L, (δΔQ=4.8 mAh/time) is transferred in 1 sec when the number of times N of inductor operations (switching operations) is 50 and the operation of the inductor is finished in 1 sec. Accordingly, the current value of the inductor is (1.33 mA/time/inductor). At this time, assumption is made that the operation is performed with the inductor of 1 μH and module voltage V of 56V in the balance operation. By making a cycle t of the switching operation of the inductor not more than 1 sec, it is possible to achieve a continuous operation with no interruption. For example, it is possible to cause charges of 60% to 70% to move with an inductor of 10 μH and a 1 sec operation of 50 times, and achieve balancing.

In an embodiment of the present disclosure, the amount of charge obtained by dividing the amount of transferred charge necessary for balancing modules into 10 or more is transferred by one operation. Favorably, a small amount of charge obtained by dividing the amount of charge into 30 to 50 is sequentially transferred. The on-period and off-period of the switch and the number of times of transfer of charges are measured in advance, and constituted as a table by using the simulation result. Specifically, when the difference between the maximum voltage and the minimum voltage of modules is detected, information that designates the switching operation and the number of times of switching corresponding to this difference is read from the table and used for control of the switching element.

(Modified Example of Inter-Module Balance Circuit According to Present Disclosure)

In the above-mentioned inter-module balance circuit according to the present disclosure, electric power taken out via one flyback transformer is caused to move via one flyback transformer. However, electric power may be taken out via a plurality of flyback transformers. For example, electric power may be taken out from two power storage modules of the power storage module having the maximum voltage and the power storage module having the second highest voltage. Further, the taken-out electric power may be caused to move via a plurality of flyback transformers. For example, electric power may be supplied to two power storage modules of the power storage module having the minimum voltage and the power storage module having the second lowest voltage. For example, in the above-mentioned configuration shown in FIG. 21, electric power is taken out with low current via the flyback transformer T14 and electric power is taken out with high current via the flyback transformer T3. Further, it is possible to supply electric power with middle current via the flyback transformers T1 and T2 at the same time as electric power is taken out.

Figure 32:
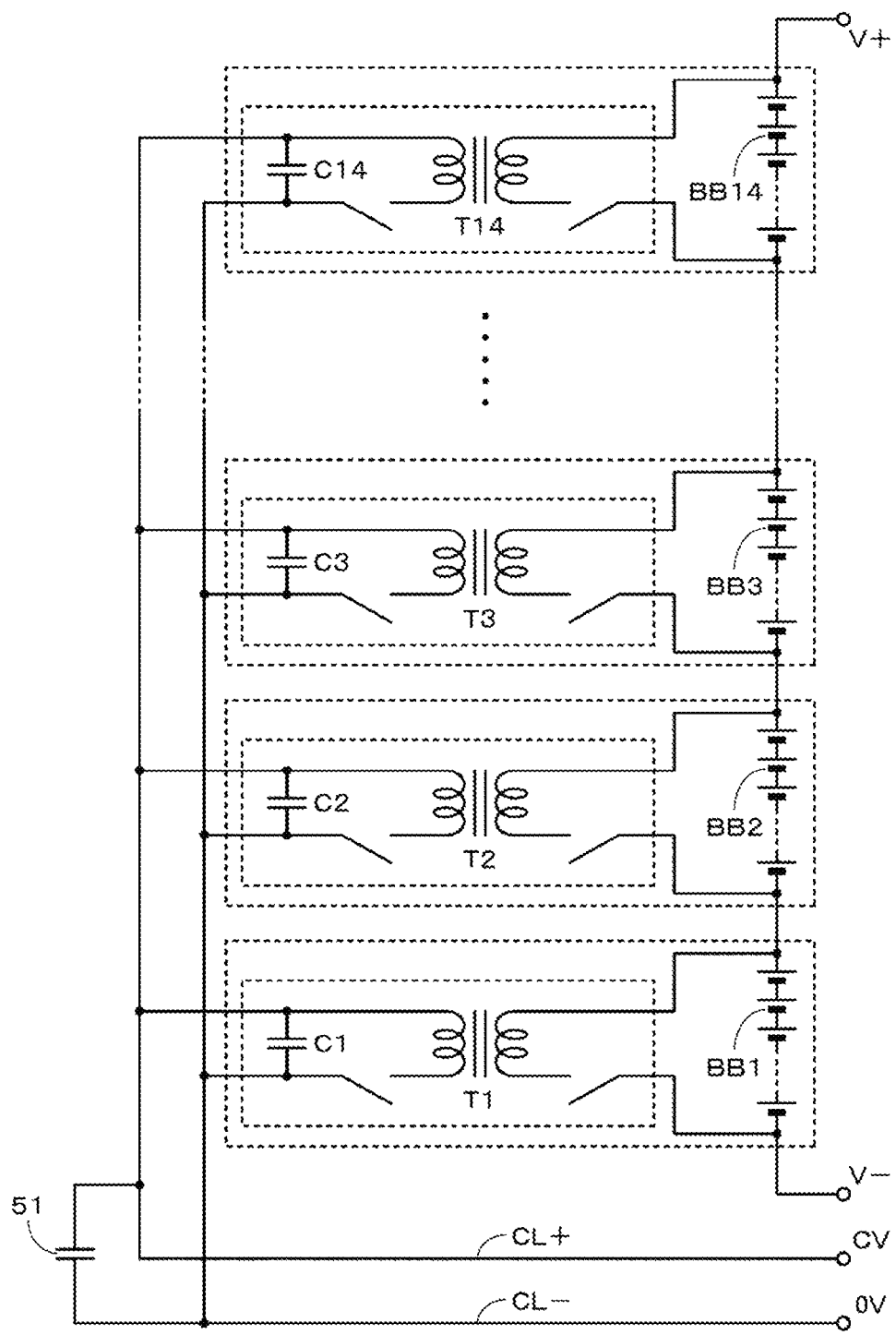
FIG. 32 A connection diagram of a second example of the inter-module balance circuit in the present disclosure.

As shown in FIG. 32, to the secondary side of the flyback transformers T1 to T14 of the power storage modules, capacitors C1 to C14 are inserted between the common power source line CL+ and the common power source line CL−. The capacitors C1 to C14 reduce high-frequency components. Accordingly, it is possible to output voltage generated in the common power source lines CL+ and CL− as a direct current power source. This direct current power source may be supplied as a power source of the control box ICNT.

Figure 33:
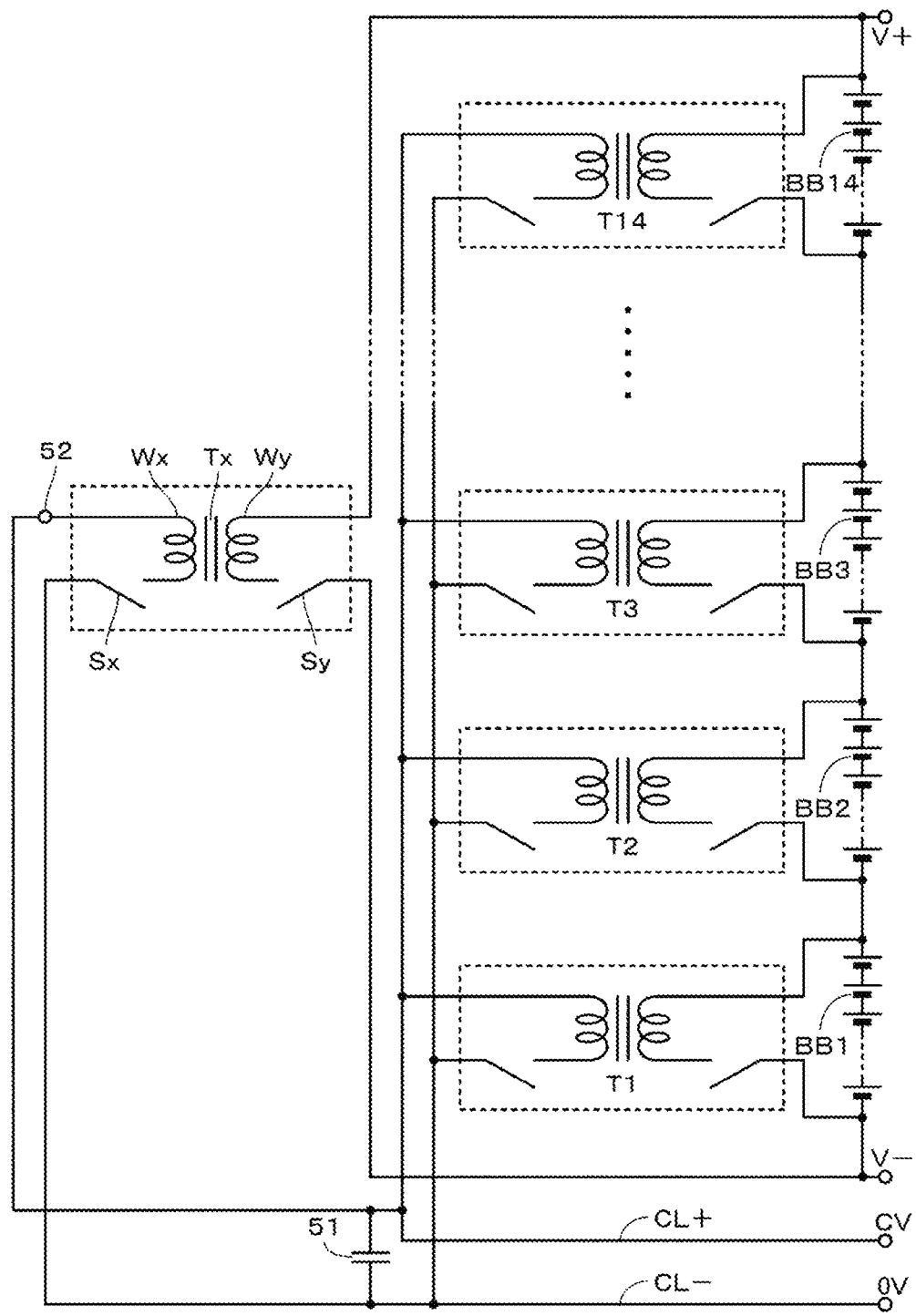
FIG. 33 A connection diagram of a third example of the inter-module balance circuit in the present disclosure.

Further, as shown in FIG. 33, a flyback transformer Tx may be commonly provided for all of the power storage modules. The flyback transformer Tx is formed of a primary side coil Wy, a secondary side coil Wx, and a magnetic core Mx. The coil Wx and a switch Sx are connected in series. The coil Wy and a switch Sy are connected in series. One end of the secondary side coil Wx of the flyback transformer Tx is connected to a terminal 52, and the other end of the secondary side coil Wx is connected to a line of 0 V via the switch Sx. The terminal 52 is connected to the common power source voltage CV terminal.

One end of the primary side coil Wy is connected to the positive side (V+) of series connection of the battery block groups BB1 to BB14 of the plurality of power storage modules, e.g., 14 power storage modules, and the other end of the primary side coil Wy is connected to the negative side (V−) of the series connection of the battery block groups BB1 to BB14. The flyback transformers T1 to T14 and the power storage element 51 are connected to the battery block groups BB1 to BB14 similarly to the configuration shown in FIG. 21, and the above-mentioned inter-module balance control is performed.

With the configuration shown in FIG. 33, it is possible to supply electric power to battery block groups of all of the power storage modules at one time via the flyback transformer Tx, and increase the variation of the operation of the inter-module balance control.

Further, in the present disclosure, it is possible to use a forward converter using a system other than the flyback converter system and an power transmission apparatus using an electromagnetic coupling system such as an RCC (Ringing Choke Converter) system.

Figure 34:
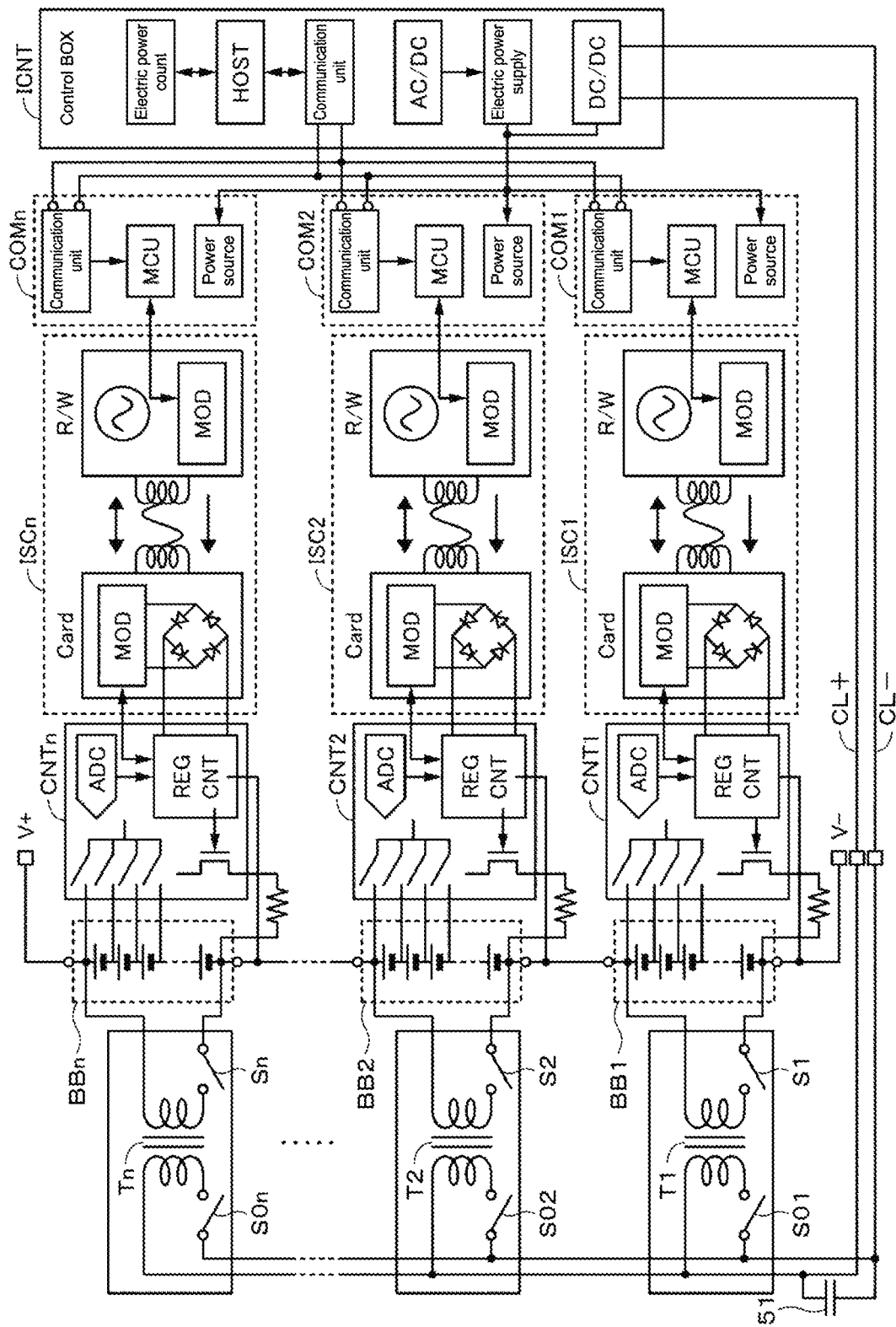
FIG. 34 A block diagram of an example of a power storage system including the inter-module balance circuit in the present disclosure.

An example of the overall configuration of the power storage system including power storage modules, e.g., the power storage modules MOD1 to MODn, is shown in FIG. 34. The control box ICNT determines the sequence of the inter-module balance from voltage information of each module. Existence or non-existence of charge and discharge of the inter-module balance is individually transmitted to the MCUs in the communication units COM1 to COMn of the modules. Each MCU supplies directly a control signal to the secondary side of each flyback transformer or transmits a control signal to the primary side of each flyback transformer through insulated communication via an insulating portion ISC.

The control signal is supplied from separate circuit blocks to the primary side and the secondary side. This is because the level of the control signal differs. Further, the control box ICNT monitors the voltage between power source lines CL+ and CL− to which the common power source voltage CV is supplied and performs overall control of the inter-module balance so that the common power source voltage CV is desired voltage, in parallel with the above-mentioned operation.

Figure 35:
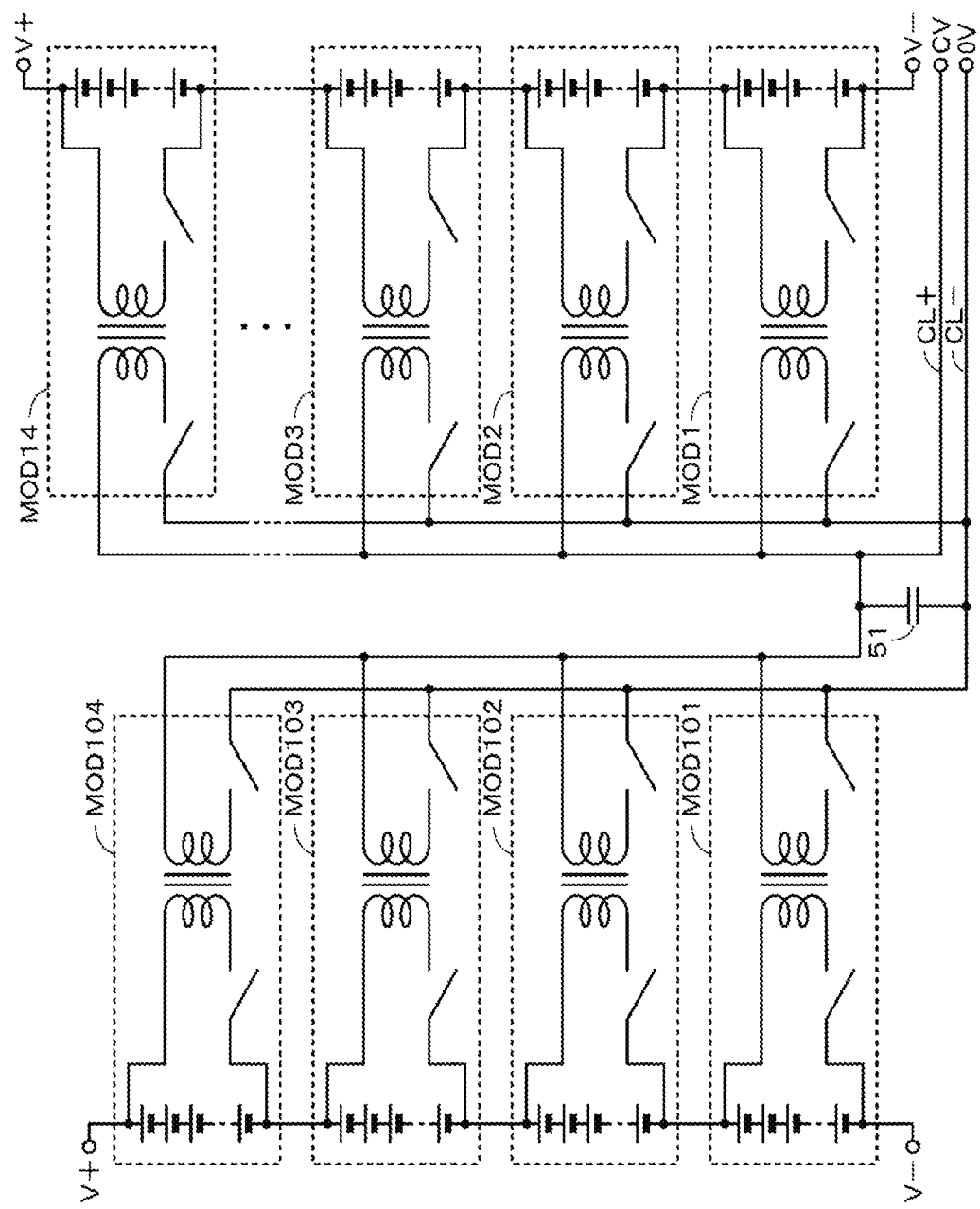
FIG. 35 A connection diagram of a fourth example of the inter-module balance circuit in the present disclosure.

FIG. 35 shows an application example of the present disclosure, and another power storage system including power storage modules MOD101 to MOD104 is connected to the power storage modules MOD1 to MOD14 (configuration shown in FIG. 21). The common power source lines CL+ and CL− can be connected also to another power storage system as long as the common power source voltage CV is equal between the two power storage systems. Specifically, it is easy to increase the number of power storage modules to be connected.

(Advantages of Power Storage Apparatus According to Present Disclosure)

Because the inter-module balance circuit according to the present disclosure has a configuration in which flyback transformers of the modules are separately provided, it does not need to perform star-like wiring and easily perform wiring unlike the configuration in which a magnetic core is commonly used.

In the inter-module balance circuit according to the present disclosure, voltage at both ends of the battery block group of each power storage module is applied to the primary side coil and switch of the flyback transformer, and the common power source voltage CV is applied to the secondary side coil and switch. The common power source voltage CV has, for example, a value that is equal to that of the voltage at both ends of the battery block group of each power storage module. Therefore, there is an advantage in which a coil and switch that have low pressure resistance can be used because the voltage of series connection of all of the power storage modules is not applied to the coil and switch.

In the present disclosure, it is possible to control the primary side switches S1 to S14 and the secondary side switch S01 to S014 of the flyback transformers with independent control pulse signals. Therefore, it is possible to transmit electric power via a plurality of desired flyback transformers. Further, it is possible to individually control the amount of electric power to be caused to move via the flyback transformer by setting the length of the on-period of the switching operation. Specifically, it is possible to change the amount of electric power to be caused to move by increasing the on-period of the switch corresponding to the amount of electric power to be caused to move. In the present disclosure, charges to be moved are divided into 10 or more and caused to move from the high-voltage module to the low-voltage module unlike the preliminary proposed inter-module balance control. Therefore, it is possible to decrease the size of the inductor and wiring of the inductor circuit. Specifically, it is possible to decrease the size and capacity of the inductor and the like, and achieve size reduction of the substrate.

Further, because high current flows through the output terminals V+ and V− of the plurality of power storage modules, relatively large noise is easy to be generated. However, because the common power source voltage CV is insulated from the output terminals V+ and V−, it is possible to reduce the effect of noise due to the change in load current.

As shown in FIG. 34, it is possible to use the common power source voltage CV that is less affected by noise as a power source of the control box ICNT. In the case where the common power source voltage CV is used as the power source of the control box ICNT, it is possible to prevent the power source of the control box ICNT from being affected by the voltage change of the power storage module.

(Power Storage System in House as Application Example)

Figure 36:
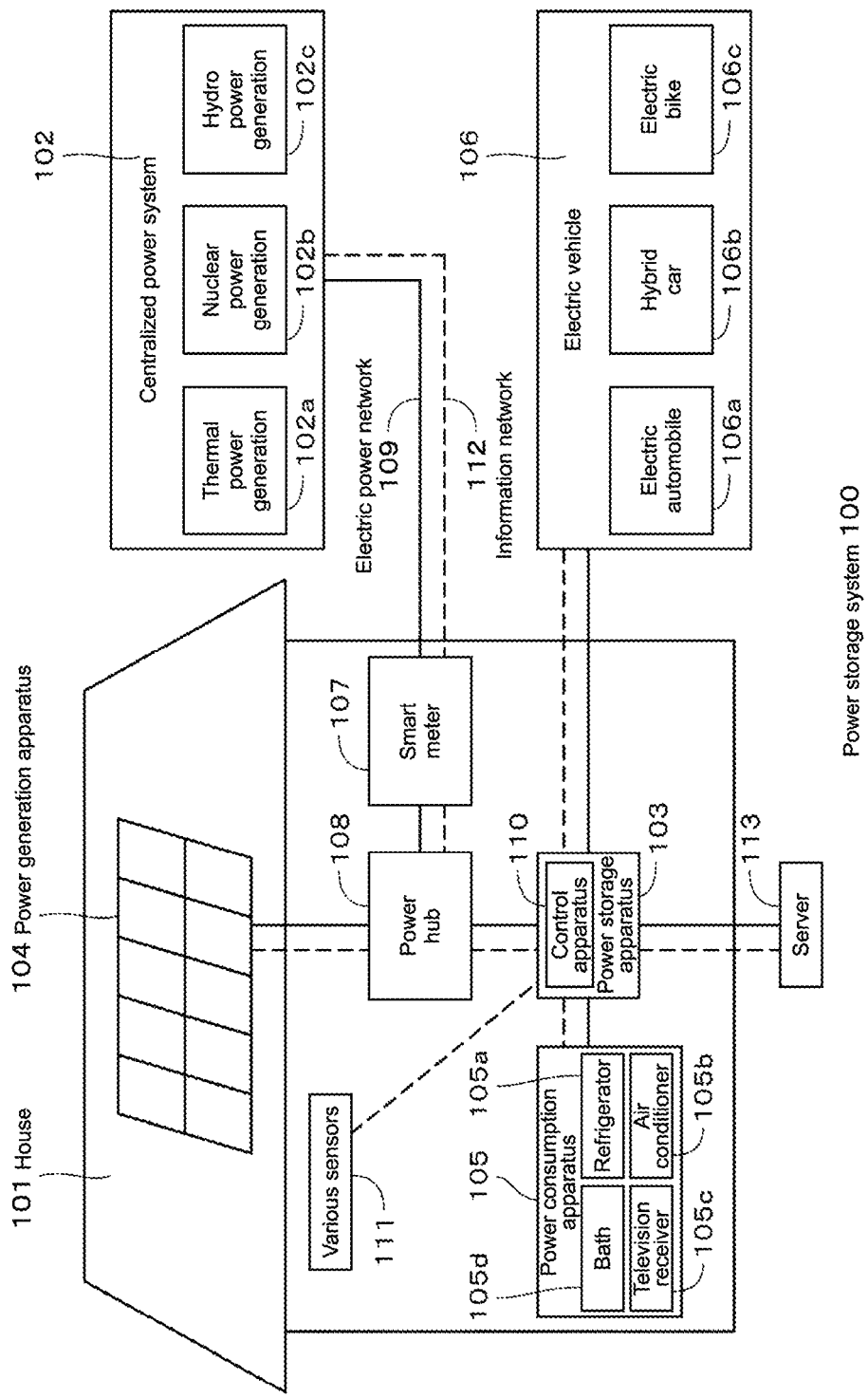
FIG. 36 A block diagram of a first example of an application example of the power storage system including the inter-module balance circuit in the present disclosure.

An example in which the present disclosure is applied to a power storage system for a house will be described with reference to FIG. 36. For example, in a power storage system 100 for a house 101, electric power is supplied from a centralized power system 102 including a thermal power generation 102a, a nuclear power generation 102b, and a hydro power generation 102c to the power storage apparatus 103 via an electric power network 109, an information network 112, a smart meter 107, a power hub 108, and the like. In addition, electric power is supplied from an independent power source such as an in-house power generation apparatus 104 to the power storage apparatus 103. The electric power supplied to the power storage apparatus 103 is stored. The power storage apparatus 103 is used to supply electric power to be used in the house 101. It is not limited to the house 101, and a similar power storage system can be used for a building.

In the house 101, a power generation apparatus 104, a power consumption apparatus 105, the power storage apparatus 103, a control apparatus 110 that controls each apparatus, the smart meter 107, and sensors 111 that acquire various kinds of information are provided. The apparatuses are connected to each other via the electric power network 109 and the information network 112. As the power generation apparatus 104, a solar battery, a fuel battery, and the like are used. The generated electric power is supplied to the power consumption apparatus 105 and/or the power storage apparatus 103. The power consumption apparatus 105 includes, for example, a refrigerator 105a, an air conditioner 105b, a television receiver 105c, and a bath 105d. Further, the power consumption apparatus 105 includes an electric vehicle 106. The electric vehicle 106 includes an electric automobile 106a, a hybrid car 106b, and an electric bike 106c.

The above-mentioned battery unit according to the present disclosure is applied to the power storage apparatus 103. The power storage apparatus 103 is formed of a secondary battery or a capacitor. For example, it is formed of a lithium ion battery. The lithium ion battery may be a stationary battery or one used in the electric vehicle 106. The smart meter 107 has a function of monitoring the amount of use of commercial electric power and transmitting the measured amount of use to an electric power company. The power supply of the electric power network 109 may be one of direct current power supply, alternating current power supply, and non-contact power supply or combination thereof.

Examples of the various sensors 111 include human sensors, illuminance sensors, object detection sensors, power consumption sensors, vibration sensors, contact sensors, temperature sensors, and infrared ray sensors. The information acquired by the various sensors 111 is transmitted to the control apparatus 110. With the information from the sensors 111, the weather state, the human state, and the like are grasped, and it is possible to minimize the energy consumption by automatically controlling the power consumption apparatus 105. Further, the control apparatus 110 is capable of transmitting the information on the house 101 to an external electric power company and the like via the Internet.

The power hub 108 executes processing such as branching of a power line and direct current/alternating current conversion. Examples of the communication system of the information network 112 connected to the control apparatus 110 include a method of using a communication interface such as a UART (Universal Asynchronous Receiver-Transmitter: transmission/reception circuit for asynchronous serial communication), and a method of using a sensor network that conforms to wireless communication standards such as Bluetooth (registered trademark), ZigBee (registered trademark), and Wi-Fi. The Bluetooth (registered trademark) system is applied to multimedia communication, and one-to-many connection communication can be performed. ZigBee (registered trademark) uses the physical layer of IEEE (Institute of Electrical and Electronics Engineers) 802.15.4.

The IEEE802.15.4 is a name of a short-range wireless network standard called PAN (Personal Area Network) or W (Wireless) PAN.

The control apparatus 110 is connected to an external server 113. This server 113 may be managed by any one of the house 101, an electric power company, and a service provider. The information transmitted/received to/from the server 113 is, for example, power consumption information, life pattern information, electric power charge, weather information, disaster information, or information on power transaction. The information may be transmitted/received to/from an in-house power consumption apparatus (e.g., television receiver). However, it may be transmitted/received to/from an out-of-home apparatus (e.g., mobile phone). The information may be displayed on an apparatus having a display function such as a television receiver, a mobile phone, and a PDA (Personal Digital Assistants).

The control apparatus 110 that controls respective units includes a CPU (Central Processing Unit), a RAM (Random Access Memory), a ROM (Read Only Memory), and the like, and is stored in the power storage apparatus 103 in this example. The control apparatus 110 is connected to the power storage apparatus 103, the in-house power generation apparatus 104, the power consumption apparatus 105, various sensors 111, and the server 113 via the information network 112, and has a function of adjusting the amount of use of commercial electric power and the amount of power generation, for example. Note that it may additionally have a function of performing power transaction in a power market, for example.

As described above, electric power generated not only by the centralized power system 102 including the thermal power generation 102a, the nuclear power generation 102b, and the hydro power generation 102c but also by the in-house power generation apparatus 104 (solar power generation, wind power generation) can be stored in the power storage apparatus 103. Therefore, even when the amount of electric power generated by the in-house power generation apparatus 104 is changed, it is possible to perform control, e.g., keep the amount of electric power transmitted to the outside constant or discharge only a necessary amount of electric power. For example, a possible method is to store electric power obtained by solar power generation in the power storage apparatus 103, and store cheap midnight electric power in the power storage apparatus 103 and use the electric power stored in the power storage apparatus 103 by discharging it at the daytime when the charge is high.

Note that although an example in which the control apparatus 110 is housed in the power storage apparatus 103 has been described in this example, it may be housed in the smart meter 107 or independently configured. Further, the power storage system 100 may be used for a plurality of houses in an apartment or for a plurality of detached houses.

(Power Storage System in Vehicle as Application Example)

Figure 37:
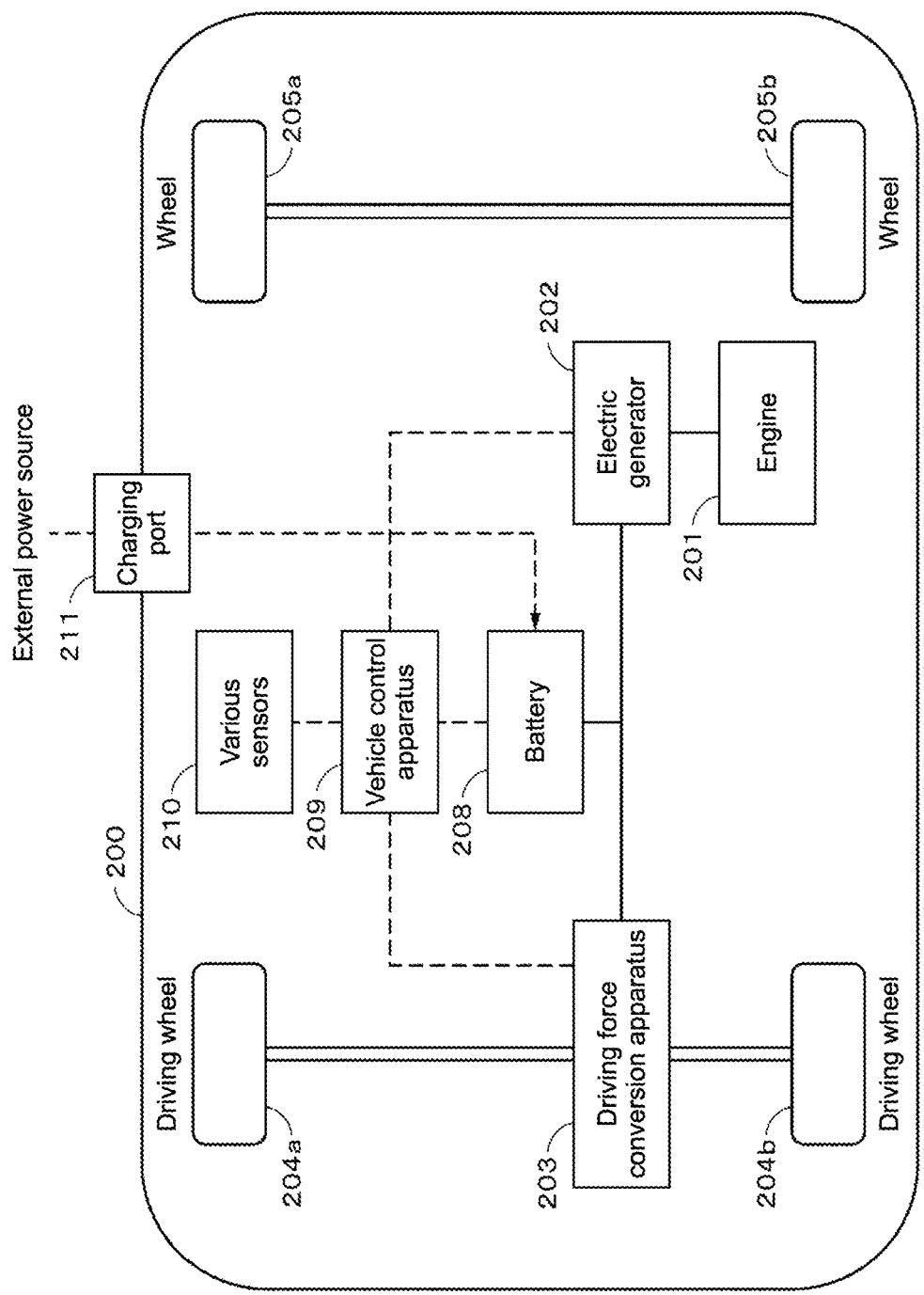
FIG. 37 A block diagram of a second example of an application example of the power storage system including the inter-module balance circuit in the present disclosure.

An example in which the present disclosure is applied to a power storage system for vehicle will be described with reference to FIG. 37. FIG. 37 schematically shows an example of the configuration of a hybrid vehicle that employs a series hybrid system to which the present disclosure is applied. A vehicle of the series hybrid system runs with a power driving force conversion apparatus by using electric power generated in a power generator that is caused to operate by an engine or electric power temporarily stored in a battery.

In this hybrid vehicle 200, an engine 201, an electric generator 202, a power driving force conversion apparatus 203, a driving wheel 204a, a driving wheel 204b, a wheel 205a, a wheel 205b, a battery 208, a vehicle control apparatus 209, various sensors 210, and a charging port 211 are mounted. To the battery 208, the above-mentioned battery unit in the present disclosure is applied.

The hybrid vehicle 200 uses the power driving force conversion apparatus 203 as a power source to run. An example of the power driving force conversion apparatus 203 is a motor. With the electric power of the battery 208, the power driving force conversion apparatus 203 operates, and the torque of the power driving force conversion apparatus 203 is transmitted to the driving wheels 204a and 204b. Note that both of an alternating current motor and a direct current motor can be applied to the power driving force conversion apparatus 203 by using direct current-alternating current (DC-AC) or reverse conversion (AC-DC conversion) at a necessary portion. The various sensors 210 controls the number of rotations of the engine via the vehicle control apparatus 209, the aperture (throttle aperture) of a throttle valve (not shown), and the like. The various sensors 210 include velocity sensors, acceleration sensors, engine number-of-rotations sensors, and the like.

The torque of the engine 201 is transmitted to the electric generator 202, and electric power generated with the torque by the electric generator 202 can be stored in the battery 208.

When the hybrid vehicle is decelerated by a braking mechanism (not shown), the resistance force at the time of the deceleration is added to the power driving force conversion apparatus 203 as torque, and regenerative electric power generated with this torque by the power driving force conversion apparatus 203 is stored in the battery 208.

By being connected to a power source outside the hybrid vehicle, the battery 208 is capable of receiving electric power supply from the external power source by using the charging port 211 as an input port, and storing the received electric power.

Although not shown, an information processing apparatus that executes information processing related to vehicle control on the basis of information on a secondary battery may be provided. Examples of such an information processing apparatus include an information processing apparatus that displays the battery remaining capacity on the basis of information on the remaining capacity of the battery.

Note that a series hybrid vehicle that runs with a motor by using electric power generated by a power generator that is caused to operate by an engine or electric power temporarily stored in a battery has been described above as an example. However, the present disclosure can be effectively applied also to a parallel hybrid vehicle that uses output of an engine and a motor as a driving source and three systems of running with only an engine, running with only a motor, and running with an engine and a motor by appropriately switching them. Further, the present disclosure can be effectively applied also to a so-called electric vehicle, which does not use an engine and runs with driving by only a driving motor.

It should be noted that the present disclosure may take the following configurations.

(1)

A power storage apparatus, including:

a plurality of battery units, each of the plurality of battery units being formed of a plurality of battery cells or a plurality of battery blocks;

series circuits, the series circuits being formed of first coils and first switching elements, the first coils and the first switching elements being connected to the respective battery units in parallel;

second coils electromagnetically coupled to the first coils;
second switching elements connected to the second coils in series;
a capacitor inserted between a common power source line CL+ and a common power source line CL− for commonly supplying voltage to both ends of the series circuits of the second coils and the second switching element related to the plurality of battery units, the voltage being set to a value not more than pressure resistance of the second switching elements; and
a control unit that supplies a control pulse signal to the first switching element and the second switching element for equalizing voltage of each of the plurality of battery units, in which
the plurality of battery units include a first battery unit, the first battery unit having the highest voltage, electric power being taken out from the first battery unit by the first and second switching elements connected to the first battery unit,
the plurality of battery units include a second battery unit, the second battery unit having the lowest voltage, electric power being supplied to the second battery unit by the first and second switching elements connected to the second battery unit, and
an amount of charge obtained by dividing an amount of transferred charge necessary for eliminating a voltage difference between the first battery unit and the second battery unit into 10 or more is transferred by switching operations of the first and second switching elements.

(2)
The power storage apparatus according to (1), in which the battery cells of the battery units are each a lithium ion secondary battery using an olivine type cathode.

(3)
The power storage apparatus according to (1) or (2), in which
respective on-periods and off-periods of the first and second switching elements are obtained depending on the amount of transferred charge in advance, and constituted as a table.

(4)
The power storage apparatus according to any one of (1) to (3), in which
number of times of operations of the first and second switching elements is obtained depending on the amount of transferred charge in advance, and constituted as a table.

(5)
An electronic apparatus, that receives electric power supplied from the power storage apparatus according to (1).

(6)
An electric vehicle, including:
a conversion apparatus that receives electric power supplied from the power storage apparatus according to (1) and converts the electric power into a driving force of a vehicle; and
a control apparatus that executes information processing related to vehicle control on the basis of information on the power storage apparatus.

(7)
An electric power system, including:
an electric power information transmission/reception unit that transmits/receives a signal to/from another apparatus via a network, in which
charge and discharge control of the power storage apparatus according to (1) is performed on the basis of information received by the electric power information transmission/reception unit.

(8)
An electric power system, that receives electric power from the power storage apparatus according to (1) or supplies electric power to the power storage apparatus from a power generation apparatus or an electric power network.

Modified Example

Note that although embodiments of the present disclosure have been specifically described, the embodiments of the present disclosure are not limited to the above-mentioned embodiments and various modifications can be made without departing from the essence of the present disclosure. For example, the configurations, the methods, the processes, the shapes, the materials, and the numerical values cited in the above-mentioned embodiments are only illustrative, and different configurations, methods, processes, shapes, materials, and numerical values may be used as necessary.

Also, the configurations, the methods, the processes, the shapes, the materials, and the numerical values in the above-mentioned embodiments can be combined without departing from the essence of the present disclosure.

REFERENCE SIGNS LIST

MOD, MOD1 to MODN power storage module
ICNT control box
CNT controller of each power storage module
ICNT control box
B1 to Bn battery block
BB1 to BBn battery block group
ISC1 to ISCn insulating portion
COM1 to COMn communication unit
21 multilayer wiring substrate
23, 24 printed circuit board antenna
LY1 to LY4 wiring layer
W1 to W14 primary side coil
S1 to S14 primary side switch
W01 to W014 secondary side coil
S01 to S014 secondary side switch
T1 to T14 flyback transformer
CL+, CL− common power source line
CV common power source voltage
51 power storage element

The invention claimed is:
1. A power storage apparatus, comprising:
a plurality of battery units, each of the plurality of battery units being formed of a plurality of battery cells or a plurality of battery blocks;
first series circuits,
the first series circuits being formed of first coils and first switching elements,
the first coils and the first switching elements being connected to respective battery units of the plurality of battery units, in parallel;
second series circuits,
the second series circuits being formed of second coils electromagnetically coupled to the first coils;
second switching elements connected to the second coils in series;
a capacitor, inserted between a first common power source line CL+ and a second common power source line CL, for commonly supplying voltage to both ends of the second series circuits of the second coils and the second switching elements, the voltage being set to a value not more than pressure resistance of the second switching elements; and a control unit that supplies a control pulse signal to the first switching elements and the second switching elements for equalizing voltage of each of the plurality of battery units, wherein:
    the plurality of battery units include a first battery unit, the first battery unit having the highest voltage among the plurality of battery units, electric power being taken out from the first battery unit by the first switching elements and the second switching elements connected to the first battery unit,
    the plurality of battery units include a second battery unit, the second battery unit having the lowest voltage among the plurality of battery units, electric power being supplied to the second battery unit by the first switching elements and the second switching elements connected to the second battery unit, and
    an amount of charge is transferred by switching operations of the first switching elements and the second switching elements, wherein the amount of charge is obtained by dividing an amount of total charge necessary for eliminating a voltage difference between the first battery unit and the second battery unit into 10 or more divisions.

2. The power storage apparatus according to claim 1, wherein
the plurality of battery cells of the plurality of battery units are each a lithium ion secondary battery using an olivine type cathode.

3. The power storage apparatus according to claim 1, wherein
respective on-periods and off-periods of the first switching elements and the second switching elements are obtained depending on the amount of total charge in advance, and constituted as a table.

4. An electronic apparatus, that receives electric power supplied from a power storage apparatus, the power storage apparatus comprising:
a plurality of battery units, each of the plurality of battery units being formed of a plurality of battery cells or a plurality of battery blocks;
first series circuits,
    the first series circuits being formed of first coils and first switching elements,
    the first coils and the first switching elements being connected to respective battery units of the plurality of battery units, in parallel;
second series circuits,
    the second series circuits being formed of second coils electromagnetically coupled to the first coils;
second switching elements connected to the second coils in series;
a capacitor, inserted between a first common power source line CL+ and a second common power source line CL−, for commonly supplying voltage to both ends of the second series circuits of the second coils and the second switching elements, the voltage being set to a value not more than pressure resistance of the second switching elements; and
a control unit that supplies a control pulse signal to the first switching elements and the second switching elements for equalizing voltage of each of the plurality of battery units, wherein:
    the plurality of battery units include a first battery unit, the first battery unit having the highest voltage among the plurality of battery units, electric power being taken out from the first battery unit by the first switching elements and the second switching elements connected to the first battery unit,
    the plurality of battery units include a second battery unit, the second battery unit having the lowest voltage among the plurality of battery units, electric power being supplied to the second battery unit by the first switching elements and the second switching elements connected to the second battery unit, and
    an amount of charge is transferred by switching operations of the first switching elements and the second switching elements, wherein the amount of charge is obtained by dividing an amount of total charge necessary for eliminating a voltage difference between the first battery unit and the second battery unit into 10 or more divisions.

5. An electric vehicle, comprising:
a conversion apparatus that receives electric power supplied from a power storage apparatus and converts the electric power into a driving force of the electric vehicle; and
a control apparatus that executes information processing related to vehicle control on the basis of information on the power storage apparatus, the power storage apparatus comprising:
a plurality of battery units, each of the plurality of battery units being formed of a plurality of battery cells or a plurality of battery blocks;
first series circuits,
    the first series circuits being formed of first coils and first switching elements,
    the first coils and the first switching elements being connected to respective battery units of the plurality of battery units, in parallel;
second series circuits,
    the second series circuits being formed of second coils electromagnetically coupled to the first coils;
second switching elements connected to the second coils in series;
a capacitor, inserted between a first common power source line CL+ and a second common power source line CL−, for commonly supplying voltage to both ends of the second series circuits of the second coils and the second switching elements, the voltage being set to a value not more than pressure resistance of the second switching elements; and
a control unit that supplies a control pulse signal to the first switching elements and the second switching elements for equalizing voltage of each of the plurality of battery units, wherein:
    the plurality of battery units include a first battery unit, the first battery unit having the highest voltage among the plurality of battery units, electric power being taken out from the first battery unit by the first switching elements and the second switching elements connected to the first battery unit,
    the plurality of battery units include a second battery unit, the second battery unit having the lowest voltage among the plurality of battery units, electric power being supplied to the second battery unit by the first switching elements and the second switching elements connected to the second battery unit, and
    an amount of charge is transferred by switching operations of the first switching elements and the second switching elements, wherein the amount of charge is obtained by an amount of charge necessary for eliminating a voltage difference between the first battery unit and the second battery unit into 10 or more divisions.

6. An electric power system, comprising:
an electric power information transmission/reception unit that transmits/receives a signal to/from another apparatus via a network, wherein
charge and discharge control of a power storage apparatus is performed on the basis of information received by the electric power information transmission/reception unit, the power storage apparatus comprising:
a plurality of battery units, each of the plurality of battery units being formed of a plurality of battery cells or a plurality of battery blocks;
first series circuits,
the first series circuits being formed of first coils and first switching elements,
the first coils and the first switching elements being connected to respective battery units of the plurality of battery units, in parallel;
second series circuits,
the second series circuits being formed of second coils electromagnetically coupled to the first coils;
second switching elements connected to the second coils in series;
a capacitor, inserted between a first common power source line CL+ and a second common power source line CL−, for commonly supplying voltage to both ends of the second series circuits of the second coils and the second switching elements, the voltage being set to a value not more than pressure resistance of the second switching elements; and
a control unit that supplies a control pulse signal to the first switching elements and the second switching elements for equalizing voltage of each of the plurality of battery units, wherein:
the plurality of battery units include a first battery unit, the first battery unit having the highest voltage among the plurality of battery units, electric power being taken out from the first battery unit by the first switching elements and the second switching elements connected to the first battery unit,
the plurality of battery units include a second battery unit, the second battery unit having the lowest voltage among the plurality of battery units, electric power being supplied to the second battery unit by the first switching elements and the second switching elements connected to the second battery unit, and
an amount of charge is transferred by switching operations of the first switching elements and the second switching elements, wherein the amount of charge is obtained by dividing an amount of total charge necessary for eliminating a voltage difference between the first battery unit and the second battery unit into 10 or more divisions.

7. An electric power system, that receives electric power from a power storage apparatus or supplies electric power to the power storage apparatus from a power generation apparatus or an electric power network, the power storage apparatus comprising:
a plurality of battery units, each of the plurality of battery units being formed of a plurality of battery cells or a plurality of battery blocks;
first series circuits,
the first series circuits being formed of first coils and first switching elements,
the first coils and the first switching elements being connected to respective battery units of the plurality of battery units, in parallel;
second series circuits,
the second series circuits being formed of second coils electromagnetically coupled to the first coils;
second switching elements connected to the second coils in series;
a capacitor, inserted between a first common power source line CL+ and a second common power source line CL−, for commonly supplying voltage to both ends of the second series circuits of the second coils and the second switching elements, the voltage being set to a value not more than pressure resistance of the second switching elements; and
a control unit that supplies a control pulse signal to the first switching elements and the second switching elements for equalizing voltage of each of the plurality of battery units, wherein:
the plurality of battery units include a first battery unit, the first battery unit having the highest voltage among the plurality of battery units, electric power being taken out from the first battery unit by the first switching elements and the second switching elements connected to the first battery unit,
the plurality of battery units include a second battery unit, the second battery unit having the lowest voltage among the plurality of battery units, electric power being supplied to the second battery unit by the first switching elements and the second switching elements connected to the second battery unit, and
an amount of charge is transferred by switching operations of the first switching elements and the second switching elements, wherein the amount of charge is obtained by dividing an amount of total charge necessary for eliminating a voltage difference between the first battery unit and the second battery unit into 10 or more divisions.

8. The power storage apparatus according to claim 1, wherein
frequencies of operations of the first switching elements and the second switching elements are obtained depending on the amount of total charge in advance, and constituted as a table.

* * * * *